(12) United States Patent
Niles et al.

(10) Patent No.: US 8,300,055 B2
(45) Date of Patent: Oct. 30, 2012

(54) USER INTERFACE FOR CONTROLLING THREE-DIMENSIONAL ANIMATION OF AN OBJECT

(75) Inventors: Gregory E. Niles, Culver City, CA (US); Guido Hucking, Los Angeles, CA (US); Brian Edward Walsh, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/052,372

(22) Filed: Mar. 21, 2011

(65) Prior Publication Data

US 2011/0173554 A1    Jul. 14, 2011

Related U.S. Application Data

(60) Division of application No. 11/786,850, filed on Apr. 13, 2007, now Pat. No. 7,932,909, which is a continuation-in-part of application No. 11/257,882, filed on Oct. 24, 2005, now abandoned, which is a continuation of application No. 10/826,973, filed on Apr. 16, 2004.

(51) Int. Cl.
| | |
|---|---|
| G06T 13/00 | (2011.01) |
| G06T 15/00 | (2011.01) |
| G06T 17/00 | (2006.01) |
| G09G 5/00 | (2006.01) |
| G06F 3/048 | (2006.01) |

(52) U.S. Cl. ........ 345/473; 345/419; 345/420; 345/619; 715/773; 715/833

(58) Field of Classification Search ............... 345/473, 345/474, 649, 650, 653, 658, 420, 427; 715/700, 715/773, 833
See application file for complete search history.

(56) References Cited

U.S. PATENT DOCUMENTS

| | | | |
|---|---|---|---|
| 4,841,291 | A | 6/1989 | Swix et al. |
| 5,261,041 | A | 11/1993 | Susman |
| 5,428,721 | A | 6/1995 | Sato et al. |
| 5,467,288 | A | 11/1995 | Fasciano et al. |
| 5,513,303 | A | 4/1996 | Robertson et al. |
| 5,544,295 | A | 8/1996 | Capps |
| 5,583,981 | A | 12/1996 | Pleyer |
| 5,588,098 | A | 12/1996 | Chen et al. |
| 5,596,694 | A | 1/1997 | Capps |
| 5,619,631 | A | 4/1997 | Schott |
| 5,673,380 | A | 9/1997 | Suzuki |
| 5,717,848 | A | 2/1998 | Watanabe et al. |
| 5,731,819 | A | 3/1998 | Gagne et al. |

(Continued)

OTHER PUBLICATIONS

Hunter et al., "Using Maya Essentials: Version 3", Copyright © 2000, Alias|Wavefront, A Division of Silicon Graphics Limited, 191 pages, retrieved from: http://alain.com.tw/alainsite/soft/UsingMAYA/Essentials.pdf.*

(Continued)

*Primary Examiner* — Daniel Hajnik
*Assistant Examiner* — Roberta D Prendergast
(74) *Attorney, Agent, or Firm* — Fish & Richardson P.C.

(57) ABSTRACT

A user can control the animation of an object via an interface that includes a control area and a user-manipulable control element. The control area includes an ellipse. The user-manipulable control element includes a three-dimensional arrow with a straight body, a three-dimensional arrow with a curved body, or a sphere. In one embodiment, the interface includes a virtual trackball that is used to manipulate the user-manipulable control element.

20 Claims, 15 Drawing Sheets

U.S. PATENT DOCUMENTS

| | | | |
|---|---|---|---|
| 5,835,692 | A | 11/1998 | Cragun et al. |
| 5,835,693 | A | 11/1998 | Lynch et al. |
| 5,883,639 | A | 3/1999 | Walton et al. |
| 5,923,561 | A | 7/1999 | Higasayama et al. |
| 5,977,970 | A | 11/1999 | Amro et al. |
| 6,011,562 | A | 1/2000 | Gagne et al. |
| 6,045,446 | A | 4/2000 | Ohshima |
| 6,115,053 | A | 9/2000 | Perlin |
| 6,141,018 | A | 10/2000 | Beri et al. |
| 6,144,381 | A | 11/2000 | Lection et al. |
| 6,154,601 | A | 11/2000 | Yaegashi et al. |
| 6,266,053 | B1 | 7/2001 | French et al. |
| 6,271,863 | B1 | 8/2001 | Bose et al. |
| 6,285,347 | B1 | 9/2001 | Watanabe et al. |
| 6,285,380 | B1 | 9/2001 | Perlin et al. |
| 6,310,621 | B1 | 10/2001 | Gagne et al. |
| 6,317,128 | B1 | 11/2001 | Harrison et al. |
| 6,317,140 | B1 | 11/2001 | Livingston |
| 6,353,437 | B1 | 3/2002 | Gagne |
| 6,369,821 | B2 | 4/2002 | Merrill et al. |
| 6,414,685 | B1 | 7/2002 | Takakura et al. |
| 6,469,711 | B2 | 10/2002 | Foreman et al. |
| 6,500,008 | B1 | 12/2002 | Ebersole et al. |
| 6,512,522 | B1 | 1/2003 | Miller et al. |
| 6,525,736 | B1 | 2/2003 | Erikawa et al. |
| 6,532,014 | B1 | 3/2003 | Xu et al. |
| 6,573,896 | B1 | 6/2003 | Dumas et al. |
| 6,636,242 | B2 | 10/2003 | Bowman-Amuah |
| 6,664,986 | B1 | 12/2003 | Kopelman et al. |
| 6,690,376 | B1 | 2/2004 | Saito et al. |
| 6,714,201 | B1 | 3/2004 | Grinstein et al. |
| 6,756,984 | B1 | 6/2004 | Miyagawa |
| 6,760,030 | B2 | 7/2004 | Hiroike et al. |
| 6,762,778 | B1 | 7/2004 | Golibrodski et al. |
| 6,778,195 | B2 | 8/2004 | Venolia |
| 6,809,744 | B2 | 10/2004 | Ebersole et al. |
| 6,828,971 | B2 | 12/2004 | Uesaki et al. |
| 6,909,431 | B1 | 6/2005 | Anderson et al. |
| 6,967,654 | B2 | 11/2005 | Steed |
| 6,989,831 | B2 | 1/2006 | Ebersole et al. |
| 7,027,055 | B2 | 4/2006 | Anderson et al. |
| 7,050,955 | B1 | 5/2006 | Carmel et al. |
| 7,061,486 | B2 | 6/2006 | Sowizral et al. |
| 7,071,919 | B2 | 7/2006 | Hinckley et al. |
| 7,073,127 | B2 | 7/2006 | Zhao et al. |
| 7,124,366 | B2 | 10/2006 | Foreman et al. |
| 7,155,676 | B2 | 12/2006 | Land et al. |
| 7,441,206 | B2 | 10/2008 | MacPhee |
| 7,932,909 | B2 | 4/2011 | Niles et al. |
| 2002/0003540 | A1 | 1/2002 | Unuma et al. |
| 2004/0036711 | A1 | 2/2004 | Anderson |
| 2004/0039934 | A1 | 2/2004 | Land et al. |
| 2005/0268279 | A1 | 12/2005 | Paulsen et al. |
| 2006/0155576 | A1 | 7/2006 | Deluz |
| 2006/0274070 | A1* | 12/2006 | Herman et al. ............... 345/474 |

OTHER PUBLICATIONS

Hunter et al., "Using Maya Dynamics: Version 3", Copyright © 2000, Alias|Wavefront, A Division of Silicon Graphics Limited, 143 pages, retrieved from: http://www.docstoc.com/docs/6848804/Maya-dynamics-tutorial.*

"Learning Maya 2", by Alias Wavefront Education, publisher Sybex; Paperback/DVD edition, (copyright © 1999), 22 pages.*

Henriksen, K. Sporring, J. Hornbæk, K.: Virtual trackballs revisited. IEEE Transactions on Visualization and Computer Graphics, vol. 10(2), (2004) 206-216.*

Shoemake, K., May 1992, "ARCBALL: a user interface for specifying three-dimensional orientation using a mouse", Proceedings of the Conference on Graphics interface '92, K. S. Booth and A. Fournier, Eds., Morgan Kaufmann Publishers, San Francisco, CA, pp. 151-156.*

Ablan, D., Inside LightWave® 7, Jan. 2002, pp. x-xi, 736-753, 767-772.

Adams, M., et al., "Inside Maya 5," Jul. 2003, pp. x, 346-349.

Alias Wavefront Education, "Learning Maya 2," Maya Dynamics, 1999, 32 Pages.

Altman, R. B., "Applying Preset Animations" Visual QuickStart Guide Power Point, 2000/98, May 7, 1999, ProQuest Safari Books, Peachpit Press, [online] Retrieved from the Internet: <URL: http://proquest.safaribooksonline.com/0201354411>.

"Autodesk Combustion 4: Technical Specification," Autodesk, Inc., 2005, [online] [Retrieved on Jun. 5, 2006] Retrieved from the Internet: <URL: http://images.autodesk.com/adsk/files/Combustion4_Specs_R2-2.pdf>.

Baraff, D., "Analytical Methods for Dynamic Simulation of Non-Penetrating Rigid Bodies," Computer Graphics, Jul. 1989, pp. 223-232, vol. 23, No. 3.

Brennan, J., et al., Boris FX Version 7.0 User Guide, Oct. 2003, USA.

"BRYCE 5.0 User Guide for Macintosh® and Windows®," DAZ® Productions, Inc., 2004, [Retrieved on Apr. 27, 2005] Retrieved from the Internet: <URL: http://bryce.daz3d.com/Bryce5_Manual_DAZ.pdf>.

Conner, D., et al., "Three-dimensional widgets," Proceedings of the 1992 Symposium on interactive 3D Graphics, ACM 1992, pp. 183-188, 230-231.

"Core Video Programming Guide," Apple Computer, Inc., 2004-2005, [Retrieved on May 3, 2005] Retrieved from the Internet: <URL: http://developer.apple.com/documentation/GraphicsImaging/Conceptual/CoreVideo/CoreVideo.pdf>.

Dinerstein, J., et al., "Improved Behavioral Animation Through Regression," Proceedings of Computer Animation and Social Agents (CASA) Conference, 2004, pp. 231-238.

"DIRECTOR® MX 2004: Using Director," Macromedia, Inc., Sep. 2004, [Retrieved on Apr. 27, 2005] Retrieved from the Internet: <URL: http://download.macromedia.com/pub/documentation/en/director/mx2004/using_drmx2004.pdf>.

Derakhshani, D., "Introducing Maya 5 3D for Beginners," Chapter 12, 2003, pp. 327-341.

"Final Cut Pro 5: Real-time editing for DV, SD, HD and film," Apple Computer, Inc., [Retrieved on May 2, 2005] Retrieved from the Internet: <URL: http://www.apple.com/finalcutstudio/finalcutpro/>.

Fitzmaurice, G., "Graspable User Interfaces," PhD Thesis for the University of Toronto, 1996, 181 Pages.

He, T., et al., "Virtual input devices for 3D systems," Proceedings of the 4$^{th}$ Conference on Visualization '93, IEEE Visualization, IEEE Computer Society, Oct. 25-29, 1993, pp. 142-148 and CP-14.

Henriksen. K., et al., Virtual Trackballs Revisited, IEEE Transactions on Visualization and Computer Graphics, Mar./Apr. 2004, vol. 10, No. 2, pp. 206-216.

Hinckley, K., et al., "Usability Analysis of 3D Rotation Techniques," Proceedings of the 10$^{th}$ Annual ACM Symposium on User Interface Software and Technology, UIST '97, Oct. 14-17, 1997, pp. 1-10.

"iMovie HD: Getting Started," Apple Computer, Inc., 2006, [online] [Retrieved on Jun. 5, 2006] Retrieved from the Internet: <URL: http://manuals.info.apple.com/en/iMovie_HD_6_Getting_Started.pdf>.

Kim, W.C., et al., "DON: User Interface Presentation Design Assistant," Proceedings of the 3$^{rd}$ Annual ACM SIGGRAPH Symposium on User interface software and Technology, Oct. 3-5, 1990, pp. 10-20.

Korein, J., et al., "Temporal Anti-Aliasing in Computer Generated Animation," ACM SIGGRAPH Computer Graphics, Jul. 1983, pp. 377-388, vol. 17, Iss. 3.

Kurtenbach, G., et al., "The Design of a GUI Paradigm based on Tablets, Two-Hands, and Transparency," CHI 97, Mar. 22, 1997, pp. 35-42, Atlanta, GA.

Lammers, J., et al., "Maya 4.5 Fundamentals: Particles," Jan. 14, 2003, [online] [retrieved on Feb. 17, 2007] Retrieved from Proquest Safari Books Online: <URL: http://proquest.safaribooksonline.com/0735713278>.

Litwinowicz, P. C., "Inkwell: A 2 1/2-D Animation System," Computer Graphics, Jul. 1991, pp. 113-122, vol. 25, No. 4.

"LiveType 2: User Manual," Apple Computer, Inc., 2005, [online] [Retrieved on Jun. 5, 2006] Retrieved from the Internet: <URL: http://manuals.info.apple.com/en/LiveType_2_User_Manual.pdf>.

May, S. F., "Encapsulated Models: Procedural Representations for Computer Animation", Ph. D. Dissertation, Department of Computer and Information Science, Ohio State University, 1998.

"Motion Product Overview", Apple Computer, Inc., Jun. 2004, [online] [Retrieved on Sep. 5, 2005] Retrieved from the Internet: <URL: http://images.apple.com/motion/pdf/Motion_PO_20040615.pdf>.

"Particle Studio," Digimation, Inc., 1996-2003, [Retrieved on Apr. 27, 2005] Retrieved from the Internet: <URL:_http://www.digimation.com/software/asp/product.asp?product_id=63>.

"ParticleIllusion 3.0 Guide," Wondertouch, LLC, [Retrieved on Apr. 27, 2005] Retrieved from the Internet: <URL: http://www.wondertouch.com/downloads/updates/Manual_301.zip>.

PCT International Search Report and Written Opinion, PCT/US2005/012735, Aug. 31, 2006.

PCT Invitation to Pay Additional Fees/Partial International Search; PCT/US2005/012735, Sep. 30, 2005.

Press, W. H., et al., "Numerical Recipes in C: The Art of Scientific Computing," Oct. 30, 1992, pp. 710-714.

"Product Overview: Adobe After Effects 7.0," Adobe Systems Incorporated, Nov. 2005, [online] [Retrieved on Jun. 5, 2006] Retrieved from the Internet: <URL: http://www.adobe.com/products/aftereffects/pdfs/aftereffects_overview.pdf>.

"Product Overview: Adobe Photoshop CS2," Adobe Systems Incorporated, 2005, [online] [Retrieved on Jun. 5, 2006] Retrieved from the Internet: <URL: http://www.adobe.com/products/photoshop/pdfs/photoshop_overview.pdf>.

"Products: Crowd!®," Vital Idea Inc., 2004, [online] [Retrieved on May 3, 2005] Retrieved from the Internet: <URL: http://vitalidea.com/products/crowd/>.

"Products: Digital Fusion 4: Fusion 5 Upgrades," eyeon Software Inc., [Retrieved on Apr. 27, 2005] Retrieved from the Internet: <URL: http://eyeonline.com/Web/EyeonWeb/Products/digital_fusion/digital_fusion.aspx>.

Purcell, T. J. et al., "Ray Tracing on Programmable Graphics Hardware," ACM Transactions on Graphics, Jul. 2002, pp. 703-712, vol. 21, No. 3.

Reynolds, C. W., "Flocks, Herds, and Schools: A Distributed Behavioral Model," Computer Graphics, Jul. 1987, pp. 25-34, vol. 21, No. 4.

Rosenzweig, G., Special Edition Using® Macromedia® Director® MX, Jun. 13, 2003, pp. 453-462.

"Scalable Vector Graphics (SVG) 1.1 Specification, Chapter 19", Jan. 14, 2003 [online] [Retrieved on Sep. 5, 2005] Retrieved from the Internet: <URL: http://www.w3.org/TR/SVG/animate.html#animation-mod>.

Shoemake, K., "ARCBALL: A User Interface for Specifying Three-Dimensional Orientation Using a Mouse," Proceedings of the Conference on Graphics Interface '92, 1992, pp. 151-156.

Singh, G., et al., "A high-level user interface management system," Chi'89 Proceedings, May 1989, pp. 133-138.

Singh, K., et al., "The IBar: a perspective-based camera widget," Proceedings of the 17$^{th}$ Annual ACM Symposium on User Interface Software and Technology, UIST '04, Oct. 24-27, 2004, pp. 95-98, vol. 6, Issue 2.

"Softimage®|XSI®, Version 4.2: New Features," Avid Technology, Inc., Nov. 2004, [online] [Retrieved on Apr. 27, 2005] Retrieved from the Internet: <URL: http://www.softimage.com/products/xsi/v42/Documentation/features.pdf>.

"Technical Specifications for Shake 4," Apple Computer, Inc., [Retrieved on May 3, 2005] Retrieved from the Internet: <URL: http://www.apple.com/shake/specs.html>.

Thalmann, D., "Physical, Behavioral, and Sensor-Based Animation," Proceedings of the 6$^{th}$ International Conference on Computer Graphics & Vision (GraphiCon), 1996, pp. 214-221, St. Petersburg, Russia.

Thalmann, D., "Using Virtual Reality Techniques in the Animation Process," Virtual Reality Systems, 1993, 20 Pages.

"Tiger Developer Overview Series: Developing with Core Image," Apple Computer, Inc., Apr. 29, 2005, [online] [Retrieved on May 3, 2005] Retrieved from the Internet: <URL: http://developer.apple.com/macosx/coreimage.html>.

Tu, X., "Behavioral Animation," Jan. 1996, [online] [Retrieved on Mar. 16, 2005] Retrieved from the Internet: <URL: http://www.dgp.toronto.edu/people/tu/thesis/node35.html>.

"Using Director MX 2004 behaviors," Macromedia, Inc., 2004, [online] [Retrieved on Apr. 27, 2005] Retrieved from the Internet: <URL: http://download.macromedia.com/pub/documentation/en/director/mx.2004/drmx2004_behaviors.pdf>.

Van De Panne, M., "Control Techniques for Physically-Based Animation" (Chapter 5: Control for Turning Motions), Thesis for the Department of Electrical and Computer Engineering University of Toronto, 1994, 42 pages, can be retrieved at <URL: http://www.dgp.utoronto.ca/~van/phd.ps.gz>.

"Virtools™ Dev: Develop Online and Offline Applications With Rich Interactivity," Virtools SA, [online] [Retrieved on Apr. 27, 2005] Retrieved from the Internet: <URL: http://www.virtools.com/solutions/products/pdfs/VirtoolsDev_3.pdf>.

"WildfxPro: Wild FX Pro Video Titling and Text Animation Software," Wildform, Inc., 2005 [Retrieved on May 3, 2005] Retrieved from the Internet: <URL: http://www.wildform.com/wildfx/wildfxpro.php?sid=DCD9-2B90-420a8e669f030&ref=>.

"Woodland Games: Carpet Golf," Dec. 31, 1998, [online] [Retrieved on Aug. 4, 2006] Retrieved from the Internet: <URL: http://www.woodlands-junior.kent.sch.uk/Games/lengame/cgolf/>.

Ziauddin, I., "Behavioral Animation," Jan. 2001 [Retrieved on Mar. 16, 2005] Retrieved from the Internet: <URL: http://www.gignews.com/behavioral_animation.htm>.

Office Action for U.S. Appl. No. 12/729,912, Aug. 20, 2010, 18 Pages.

Office Action for U.S. Appl. No. 12/729,912, Feb. 7, 2011, 16 Pages.
Office Action for U.S. Appl. No. 12/729,890, Dec. 2, 2010, 22 Pages.
Office Action for U.S. Appl. No. 12/729,890, Jun. 25, 2010, 21 Pages.
Office Action for U.S. Appl. No. 11/257,882, May 27, 2009, 23 pages.
Office Action for U.S. Appl. No. 10/826,973, Feb. 19, 2009, 24 pages.
Office Action for U.S. Appl. No. 10/826,973, Sep. 2, 2009, 13 pages.

* cited by examiner

Spin behavior with axis set to the default Z.

Axis set to X

Axis set to Y

2D Emitter HUD

USER INTERFACE FOR CONTROLLING THREE-DIMENSIONAL ANIMATION OF AN OBJECT

CROSS-REFERENCE TO RELATED APPLICATIONS

This application is a divisional of U.S. patent application Ser. No. 11/786,850, for "User Interface for Controlling Three-Dimensional Animation of an Object," filed Apr. 13, 2007, which is a continuation-in-part of U.S. patent application Ser. No. 11/257,882, for "User Interface for Controlling Animation of an Object," filed Oct. 24, 2005, which is a continuation of U.S. patent application Ser. No. 10/826,973, for "Animation of an Object Using Behaviors," filed Apr. 16, 2004. The disclosures of all of these applications are incorporated herein by reference. Also, all of these applications are commonly owned.

BACKGROUND OF THE INVENTION

1. Field of the Invention

This invention relates generally to computer animation and, more specifically, to animating an object using behaviors.

2. Background Art

In the last few decades, computers and software have been used to animate objects. Initially, animation software was complicated and difficult to use. A user was generally required to interact with objects using a low level of abstraction. For example, a user would manually create different visual representations of an object (keyframes) and then use software to interpolate between them.

Recently, animation software has become more user-friendly, enabling a user to interact with objects at a higher level of abstraction. For example, a user may animate an object by applying a "behavior" to the object. A behavior is an animation abstraction and can be thought of as a macro, script, or plugin. When a behavior is applied to an object, the object is animated in a particular way (e.g., by growing or shrinking or by moving in a specific direction). Some examples of animation software that support behaviors are Anark Studio and Macromedia Director MX.

Although behaviors make it easier to animate objects, software that supports behaviors can still be difficult to use. Many types of behaviors may be applied to one object, and each type of behavior can be customized based on several parameters. Understanding each of these parameters and its effect on the behavior can be confusing. Providing values for all of these parameters can also be time-consuming.

What is needed is a better user interface for animating objects using behaviors.

SUMMARY

Various embodiments of the invention cover various aspects of behaviors and working with behaviors. One embodiment covers behaviors themselves, including animations that can be produced by applying a behavior to an item and the algorithms underlying these animations. Another embodiment covers using behaviors in conjunction with keyframes. Yet another embodiment covers working with behaviors, including setting parameters of behaviors, saving behaviors, and creating new behaviors. Yet another embodiment covers objects to which behaviors may be applied, including, for example, images, text, particle systems, filters, generators, and other behaviors. Yet another embodiment covers dynamic rendering of objects to which behaviors have been applied, including changing an animation in real-time after the value of a behavior parameter has been changed. Yet another embodiment covers hardware acceleration methods that enable users to work effectively with behaviors.

A user can control the animation of an object via an interface that includes a control area and a user-manipulable control element. The control area includes an ellipse. The user-manipulable control element includes a three-dimensional arrow with a straight body, a three-dimensional arrow with a curved body, or a sphere. In one embodiment, the interface includes a virtual trackball that is used to manipulate the user-manipulable control element.

Figure 1:
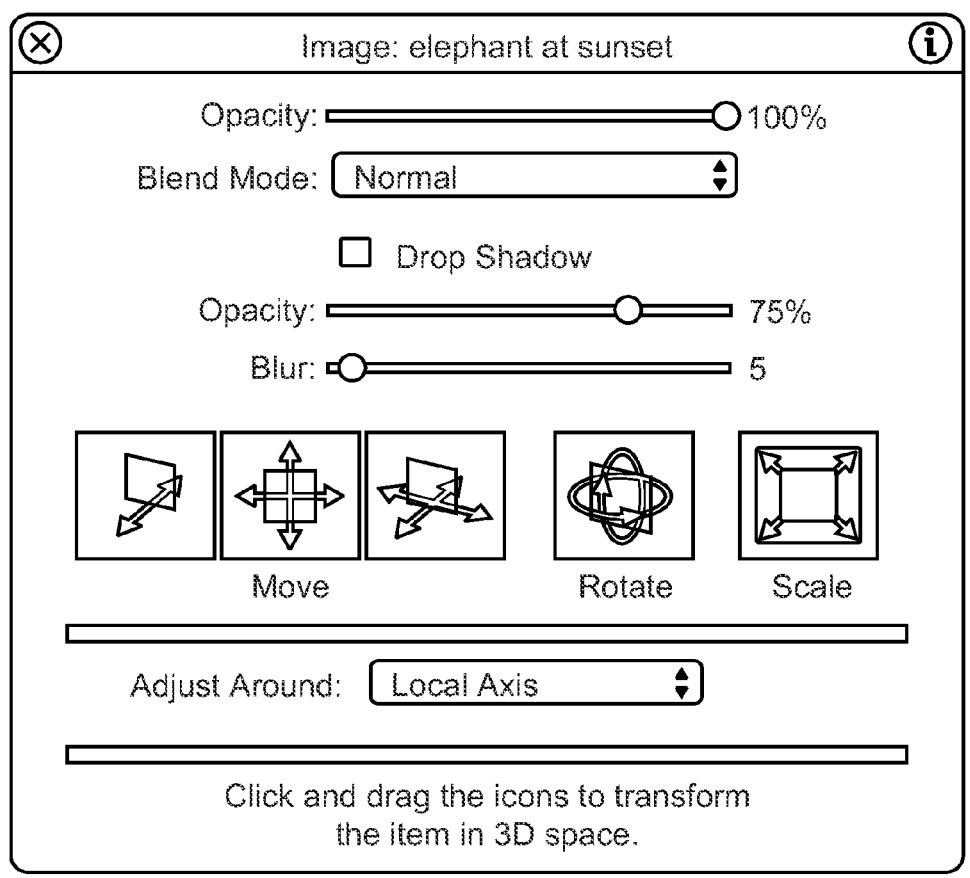
FIG. 1 illustrates one example of a HUD, according to one embodiment of the invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

The visual representation of an object can be specified by two pieces of information: a source image and a collection of parameters that modify the source image. By modifying the values of these parameters over time, an object can be animated. For example, by modifying the size or opacity of an image over time, the object can appear to grow or shrink or fade in or fade out, respectively. As another example, the visual representation of an object can be assigned a position parameter. By modifying the value of this position parameter over time, the object can appear to move.

In one embodiment, a behavior is an animation abstraction that, when applied to an object, causes the object to be animated in a particular way. Specifically, a behavior changes the value of a parameter of the object over time, thereby animating the object with respect to that parameter. For example, a "shrink" behavior can cause an object to decrease in size by decreasing the values of the object's length and height parameters. As another example, a "throw" behavior can cause an object to move in a specific direction with a specific speed by modifying the object's position parameter over time.

In one embodiment, a behavior changes the value of only one parameter of an object over time. For example, a "stretch" behavior can stretch an object by increasing the value of the object's length parameter while not modifying the value of the object's height parameter. In another embodiment, a behavior changes the value of more than one parameter of an object over time. For example, the "shrink" behavior mentioned above decreases the values of the object's length and height parameters. Thus far, only two ways have been discussed in which a behavior can affect the value of a parameter of an object—increasing and decreasing. However, many more such ways exist. These ways include, for example, oscillating, randomizing, and reversing.

Recall that a behavior changes the value of a parameter of an object over time. While a behavior specifies how it affects a parameter, the behavior may or may not specify which parameter it affects. When a behavior specifies a particular parameter, the behavior is applied to an object and affects that particular parameter of the object. When a behavior does not specify a particular parameter, the behavior is applied to a parameter of an object (any parameter) and affects that parameter in a particular way. For example, if an oscillate behavior is applied to an object's opacity parameter, the object can appear to fade in, then fade out, then fade in, etc.

One way to refer to a behavior that specifies a parameter is to indicate which parameters the behavior affects and in what way. For example, a behavior that decreases the brightness of an object may be known as the "decrease brightness" behavior. Sometimes, though, it is more useful to name a behavior based on the animation that it causes. For example, the "decrease brightness" behavior can be called the "darken" behavior. Similarly, an "increase length, increase height" behavior can be called the "grow" behavior. Descriptive titles, such as "darken" and "grow," help the user understand how a behavior will animate an object.

In order to apply a behavior to an object, where the behavior specifies the parameter to be animated, a user selects a behavior and selects an object to which the behavior should be applied. Note that these two steps can occur in either order. In one embodiment, a user selects a behavior or an object by choosing it from a menu. In another embodiment, a user selects a behavior or an object by clicking on a visual representation of the behavior or object, such as an icon (for a behavior or an object) or the object itself (for an object). In one embodiment, a user applies a behavior to an object by clicking on the behavior and dragging it onto the target object.

In order to apply a behavior to a parameter of an object, where the behavior does not specify the parameter to be animated, a user selects a behavior and selects a parameter of an object to which the behavior should be applied. Note that these two steps can occur in either order. In one embodiment, a user selects a behavior by choosing it from a menu or by clicking on a visual representation of the behavior, as described above. In another embodiment, a user selects a parameter of an object by first selecting an object and then selecting a parameter of the object. In one embodiment, a user can select an object by choosing it from a menu or by clicking on a visual representation of the object, as described above. In another embodiment, once an object has been selected, a user can display a list of the object's parameters and select a parameter by clicking on it. In one embodiment, a user applies a behavior to a parameter of an object by clicking on the behavior and dragging it onto the target parameter. In one embodiment, an object parameter to which a behavior has been applied is identified in the list of parameters of the object. In another embodiment, an icon appears near the object parameter to which a behavior has been applied.

A behavior can be simultaneously applied to multiple objects or to multiple parameters of an object. In one embodiment, instead of selecting one object or one parameter of an object to which the behavior should be applied, the user selects multiple objects or multiple parameters of an object to which the behavior should be applied.

Once a behavior has been applied to an object or to an object parameter, it can be removed by deleting it. In one embodiment, a behavior's target object or target object parameter can be changed without having to delete the behavior and create a new behavior.

The animation caused by a behavior can be customized by specifying a value for one or more parameters associated with the behavior. For example, the "stretch" behavior can have a parameter that indicates how fast the object will stretch (i.e., at what rate the object's length parameter will increase). As another example, the "throw" behavior can have a parameter that indicates in which direction the object should move (i.e., how the object's position parameter should be changed). Initially, when a behavior is created, these parameters have default values. Ways for a user to change these values will be discussed below.

Recall that a behavior animates an object by changing the value of a parameter of the object over time. A behavior can also change the value of other types of parameters over time (such as parameters of other behaviors), thereby "animating" these parameters. For example, consider a rotation behavior (a basic motion behavior) and an oscillation behavior (a parameter behavior). The rotation behavior, which causes an object to rotate, includes a parameter that specifies the direction in which the object should rotate (e.g., clockwise versus counter-clockwise). The oscillation behavior causes a parameter to switch back and forth between two values. If the oscillation behavior is applied to the direction parameter of the rotation behavior, the object would first rotate clockwise, then counter-clockwise, then clockwise, etc. The object would therefore seem to rock back and forth.

Thus, a behavior that specifies a particular parameter is applied to an object, while a behavior that does not specify a particular parameter is applied to a parameter of an object or a parameter of another behavior.

In one embodiment, behaviors exist independently of the objects to which they are applied. This means that behaviors are reusable—i.e., the same behavior can be applied to two different objects to animate the objects in a similar way. In one embodiment, the user can select a behavior from a group of pre-defined behaviors (a "behavior library"). These behaviors can be, for example, the most useful behaviors or the most difficult behaviors to implement. A behavior in the library is saved and can be re-used in the future.

In one embodiment, the user creates behaviors to add to this library. For example, these behaviors can be created by assigning values to a behavior's parameters or by specifying a particular parameter of an object to be affected (e.g., where the behavior previously did not specify an object parameter). As another example, a user creates a behavior from scratch or combines multiple behaviors into one behavior.

As mentioned above, two behaviors can be combined to form one new behavior. Alternatively, two behaviors can be applied to the same object but still retain their independent nature. In fact, any number of behaviors can be applied to one object at the same time. In this situation, each behavior would affect the object at the same time. Sometimes, when multiple behaviors are applied to the same object, the object can be animated in a different way depending on the order in which the behaviors were applied.

Behaviors Contrasted with Keyframes

A keyframe is a visual representation of an object at a particular point in time. By defining several keyframes, a user can specify how the visual representation of an object changes over time. Since the representation of an object can change drastically between keyframes, simply showing a number of keyframes in succession could result in jerky transitions. In order to obtain a smooth animation, new visual representations are calculated that fall between keyframes in time and that are similar to surrounding keyframes. This is known as "inbetweening."

A keyframe applies a specific value to a parameter. In one embodiment, when multiple keyframes are created that specify different values for the same parameter of an object, that parameter is animated from the value in the first keyframe to the value in the last keyframe. In another embodiment, if the value specified by one keyframe is changed, the other keyframes (and thus, the values that they specify) are not modified.

In one embodiment, applying a behavior to a parameter (of either an object or another behavior) does not add keyframes to the parameter. Instead, the applied behavior generates a range of values for the parameter and then sets the parameter to these values over time, thereby animating the object (or animating the behavior, which in turn animates the object). The range of values applied to the parameter is controlled by the applied behavior's parameters. In another embodiment, an animation (e.g., of a parameter) created by applying a behavior can be converted into a set of keyframes (e.g., containing values for that parameter).

Setting Parameters of Objects and Visual Effects

A visual effect, from a behavior to a particle system to a gradient, is controlled by a collection of parameters that modify the various attributes for that effect. For example, a Blur filter has an amount slider that controls how much blur is applied. A system can contain thousands of parameters. Many different types of controls can be used to set these parameters. These controls can include, for example, sliders, dials, and pop-up menus.

Even an object to which no effects have been applied has many parameters that can be modified to alter the nature of the object and how it appears in a project. These parameters include, for example, the object's scale, opacity, and position on screen, as well as more obscure attributes such as its pixel aspect ratio or field order.

A. Inspector

In one embodiment, parameters that control a visual effect are accessed in an Inspector. In one embodiment, the Inspector contains four tabs, each of which contains a set of parameters for the selected object. The first three tabs (Properties, Behaviors, and Filters) are present for any selected object. The fourth tab (generically called the Object tab) changes its name and contents depending on the type of object selected.

The Inspector is contextual, in that what appears in the Inspector is based on the selected object. An object must be selected in order for parameters to appear in the Inspector.

i. Controls

In one embodiment, there are eleven different types of controls that can appear in the Inspector. A control provides the opportunity to change the value of a parameter in a special way. Since different types of objects and effects require different parameters, selecting different things will cause different controls to populate the Inspector.

In one embodiment, the various types of controls include slider, value slider, dial, value field, pop-up menu, value list, activation checkbox, color well, gradient editor, image well, parameter selection menu, and tracking selection pop-up menu. In one embodiment, in addition to the parameter control types listed above, several other controls are used within the Inspector. In one embodiment, these controls include: reset button, preset pop-up menu, animation menu, enable/disable animation, reset parameter, add keyframe, delete keyframe, previous keyframe, next keyframe, and show in keyframe editor.

ii. Tabs

In one embodiment, the parameters in the Inspector are grouped into four categories, which correspond to the four tabs in the Inspector: properties, behaviors, filters, and object. A category is accessed via its corresponding tab.

If a behavior is applied to an object, the parameters associated with that behavior appear in the Behaviors tab when that object has been selected. The Behaviors tab displays every behavior that's applied to the selected object. A disclosure triangle to the left of each behavior's name reveals all of that behavior's parameters. Unlike the Heads-Up Display (discussed below), the Behaviors tab displays all parameters of a behavior. In one embodiment, multiple behaviors are grouped by the behavior name.

The title and contents of the Object tab change depending on what type of object is selected. In one embodiment, there are seven types of Object tabs, corresponding to several types of objects: image, group, camera, light, media, text, mask, shape, emitter, particle cell, replicator, replicator cell, and generator. Consider a particle emitter object, which is part of a particle system (discussed below). When a particle emitter is selected, the Object tab becomes an Emitter tab. The parameters in the Emitter tab control aspects of the emitter such as the emitter shape, space (two-dimensional or three-dimensional), angle, and range. In one embodiment, the Emitter tab also provides access to cell controls. For Emitters with multiple cells, these controls affect all cells.

B. Heads-Up Display

A Heads-Up Display (HUD) is a dynamically updating floating window. FIG. 1 illustrates one example of a HUD, according to one embodiment of the invention. The HUD provides graphical animation control over a selected object that appears in the canvas window by enabling a user to modify the values of one or more parameters. Recall that the Inspector enables a user to modify all of the parameters of an object and any visual effects that have been applied to it. In one embodiment, each object or visual effect has a subset of parameters that appears in the HUD. Most of the time, the HUD displays a subset of the parameters visible in the Inspector for the selected object or visual effect. For example, the parameters that appear in the HUD are the most commonly modified or the most essential in terms of defining a visual effect. Alternatively, the HUD displays all of the parameters visible in the Inspector for the selected object or visual effect.

If a user is working in the HUD, he can quickly jump to the corresponding Inspector to access the remainder of the controls for that object. Both the HUD and the Inspector tabs reference the same parameters, so changing a parameter in one automatically changes the same parameter in the other.

In one embodiment, the HUD enables a user to animate a parameter by applying a behavior to it. For example, assume that the HUD is displaying one or more parameters for an object or a behavior. In order to animate a particular parameter, the user would Control-click on that parameter in the HUD. This would cause a shortcut menu to appear that lists one or more parameter behaviors (e.g., oscillate). The user would then select one parameter behavior.

In one embodiment, the HUD is semi-transparent. A user can set the opacity (transparency) of the HUD. The HUD is designed to keep a selected object visible even while using the HUD to adjust the object's parameters. This enables a user to keep his eye on the screen instead of switching his eye line from a main window to a utility panel and back.

i. Choosing Control Sets

Recall that a single object can have multiple visual effects applied to it. For example, a Throw behavior can be applied to a shape with a blur filter on it. In this situation, each visual effect would have its own set of controls that could be displayed in the HUD. In one embodiment, the HUD can show a variety of control sets, even for a single object. In the previous example, the HUD could conceivably show the shape controls, the blur controls, or the Throw controls. In one embodiment, the HUD shows all three. In another embodiment, a user can specify which set of controls to view in the HUD using a pop-up menu in the title bar. Control sets can be shown that are associated with, for example, behaviors, filters, and masks that have been applied to the selected object.

Figure 2:
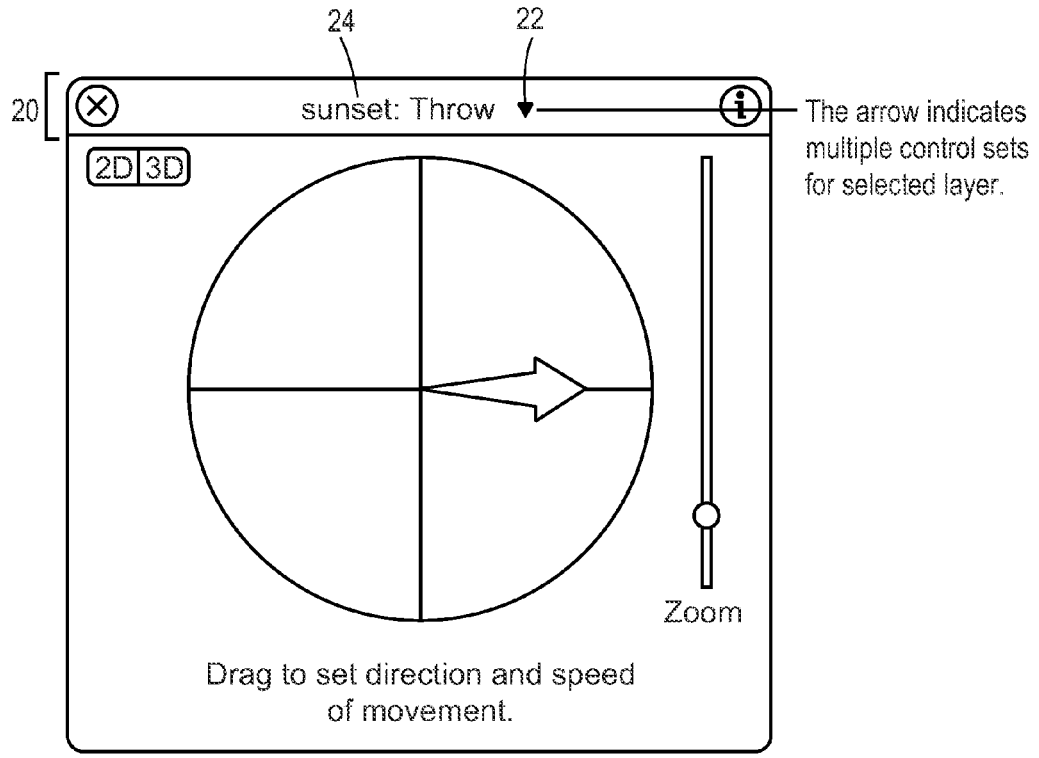
FIG. 2 illustrates one example of a HUD for an object to which multiple effects have been applied, according to one embodiment of the invention.
Figure 3:
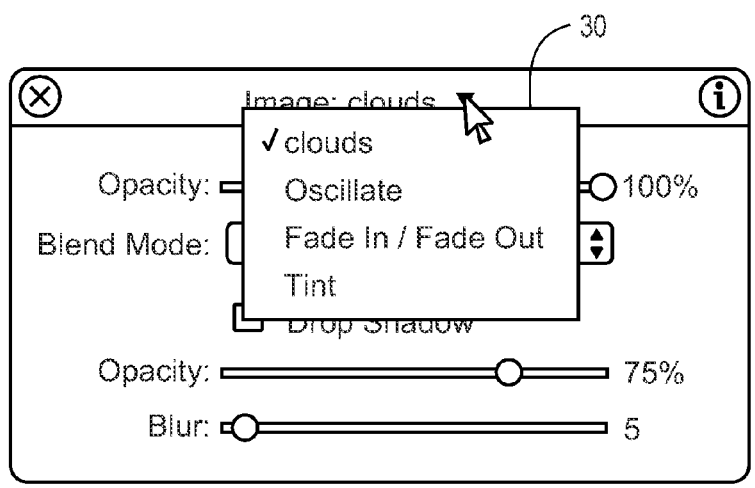
FIG. 3 illustrates one example of a HUD and a pop-up menu that lists all of the possible controls sets that can be displayed in the HUD for the selected object, according to one embodiment of the invention.

FIG. 2 illustrates one example of a HUD for an object to which multiple effects have been applied, according to one embodiment of the invention. In one embodiment, when an object is selected to which multiple effects have been applied, the HUD title bar 20 displays a small downward facing triangle 22 to the right of the HUD name 24. Clicking the triangle 22 displays a pop-up menu 30 that lists all of the possible control sets that can be displayed in the HUD for the selected object. FIG. 3 illustrates one example of a HUD and a pop-up menu that lists all of the possible controls sets that can be displayed in the HUD for the selected object, according to one embodiment of the invention.

In one embodiment, to switch between control sets on a selected item, click on the HUD title bar 20, and then choose from the pop-up menu 30 the control set to view.

In one embodiment, to switch among all behaviors applied to an object in the HUD, click the disclosure triangle 22 next to the name 24 at the top of the HUD to open a pop-up menu 30 that displays all of the behaviors, filters, and masks that are applied to that object. In one embodiment, choose a behavior from this list to display its parameters in the HUD.

In one embodiment, when multiple objects of the same type have been selected, a combined HUD appears. The title bar of this combined HUD reads "Multiple Selection."

ii. Special Controls

In one embodiment, a HUD contains controls that resemble controls used in the Inspector, such as sliders, checkboxes, and pop-up menu buttons. In another embodiment, the HUD contains special controls for certain types of effects such as Basic Motion Behaviors and particle systems. These unique controls enable a user to set multiple parameters simultaneously and in an intuitive way. In one embodiment, these controls use standard English-like terminology and simple graphical diagrams that, when dragged interactively, cause the target object to react immediately to the changes in the diagram.

Figure 4:
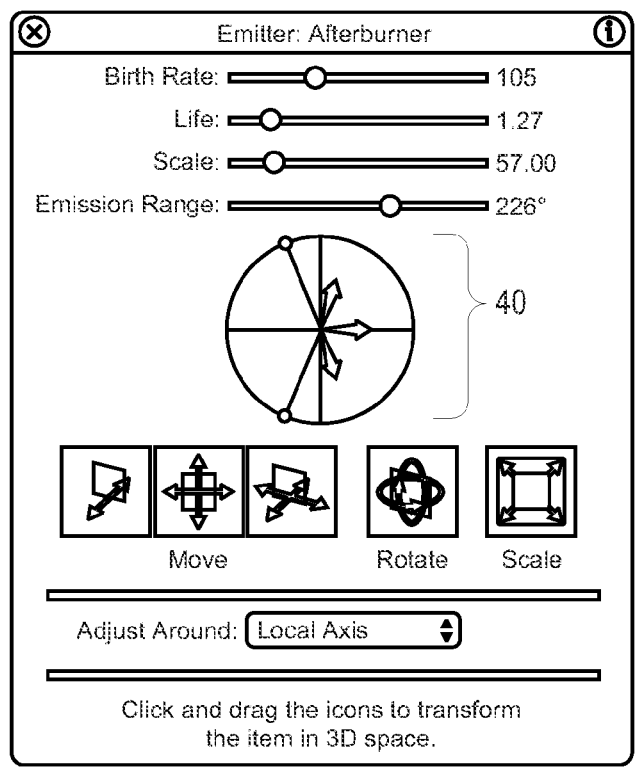
FIG. 4 illustrates one example of a HUD for an emitter of a particle system, according to one embodiment of the invention.
Figure 5:
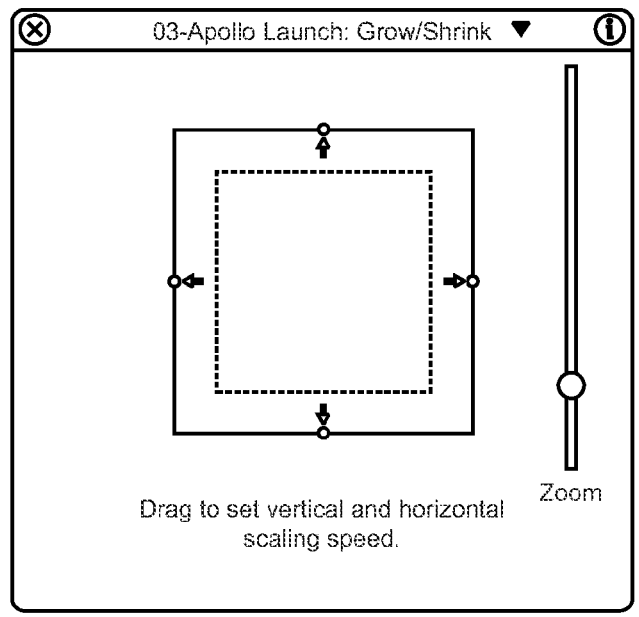
FIG. 5 illustrates one example of a HUD for a Grow/Shrink behavior, according to one embodiment of the invention.
Figure 6:
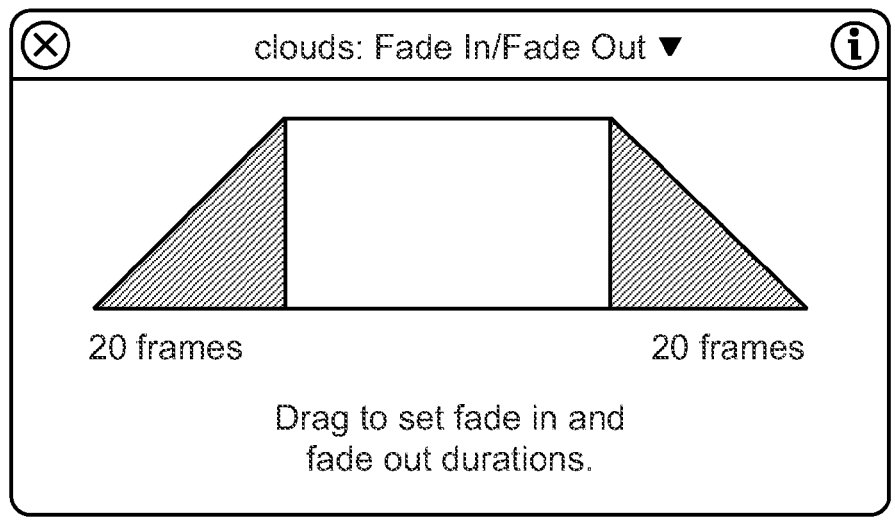
FIG. 6 illustrates one example of a HUD for a Fade In/Fade Out behavior, according to one embodiment of the invention.

For example, the two-dimensional Particle Emitter HUD contains a single control 40 that provides a graphical way to manipulate the values of three different particle system parameters: emission range, emission angle, and speed. FIG. 4 illustrates one example of a HUD for an emitter of a particle system, according to one embodiment of the invention. FIG. 5 illustrates one example of a HUD for a Grow/Shrink behavior, according to one embodiment of the invention. FIG. 6 illustrates one example of a HUD for a Fade In/Fade Out behavior, according to one embodiment of the invention.

Figure 7:
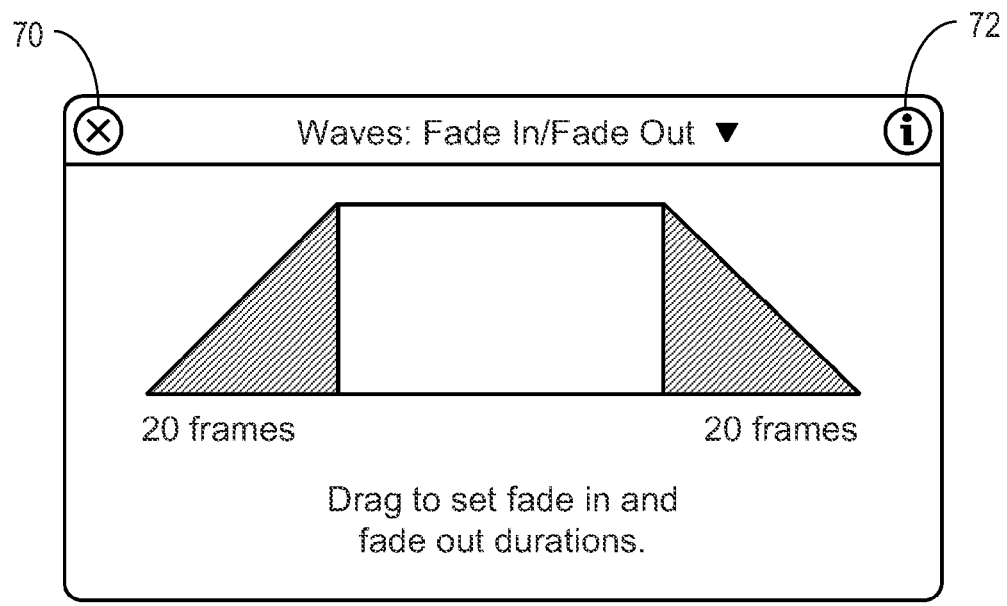
FIG. 7 illustrates the controls for the Fade In/Fade Out behavior in the HUD, according to one embodiment of the invention.
Figures 8, 9:
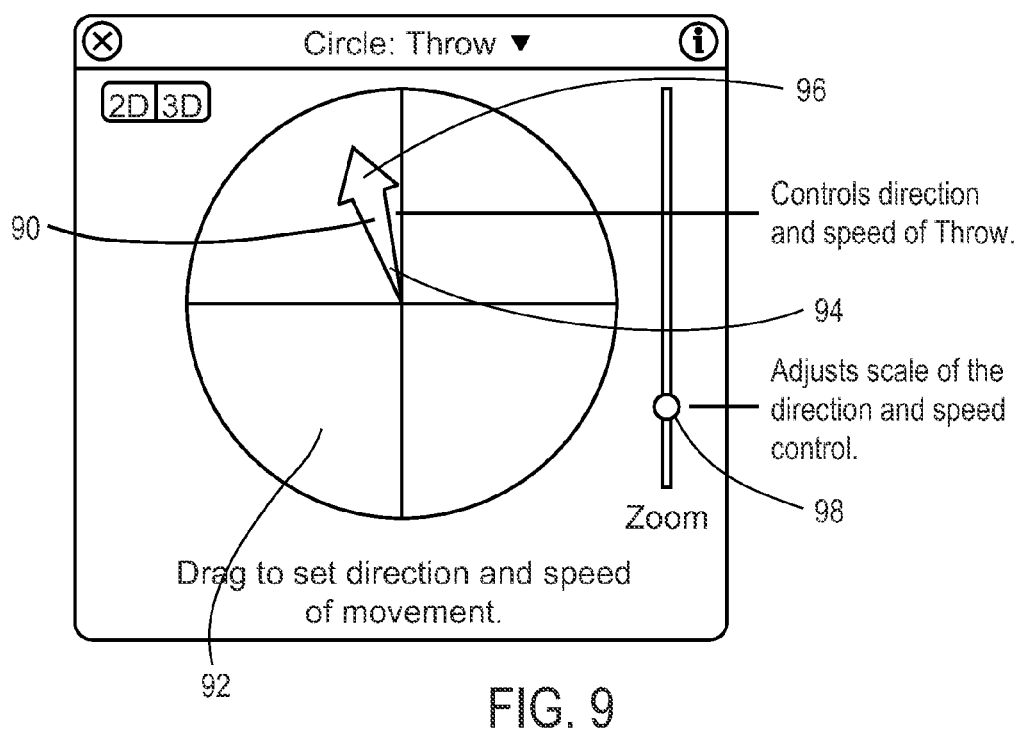
FIG. 8 illustrates the controls for the Fade In/Fade Out behavior in the Behaviors tab, according to one embodiment of the invention.
FIG. 9 illustrates a HUD for a Throw behavior where motion is two-dimensional, according to one embodiment of the invention.

Frequently, these special controls are more descriptive and easier to use than those in the Inspector. For example, compare the controls for the Fade In/Fade Out behavior in the Behaviors tab to those available in the HUD. FIG. 7 illustrates the controls for the Fade In/Fade Out behavior in the HUD, according to one embodiment of the invention. FIG. 8 illustrates the controls for the Fade In/Fade Out behavior in the Behaviors tab, according to one embodiment of the invention. Here, the controls in the HUD consolidate two of the parameters available in the Behaviors tab into a single, graphical control. There are times, however, when it may be more desirable to set parameters individually in order to finesse the effect a user is trying to achieve with greater detail, including the ability to enter specific parameter values.

Special controls will be further discussed below.

iii. Other Controls

Close Button—In one embodiment, a HUD can be closed by clicking an "x" 70 in the upper left of the HUD window.

Inspector Button—In one embodiment, if the user wants more control over the object that is being manipulated, clicking on the small "i" 72 in the upper right corner of the HUD will bring an Inspector window to the front.

Throw

The Throw behavior is a basic motion behavior. A basic motion behavior animates a specific parameter of the object to which it has been applied. Some basic motion behaviors affect an object's position, while others affect an object's scale, rotation, or opacity. A basic motion behavior can be applied to various types of objects, such as an image, a clip, a particle emitter, a shape, text, etc. Most basic motion behaviors can also be applied to cameras and lights.

The Throw behavior affects an object's position and is the simplest way of setting an object in motion. In one embodiment, the Throw behavior controls enable a user to adjust the speed and direction of a single force that is exerted on the object at the first frame of the behavior. After this initial force is applied, the object continues drifting in a straight line, and at the same speed, for the duration of the Throw behavior.

In one embodiment, the Throw behavior does not apply a continuous force, nor can a user create changes in direction or speed, since this behavior cannot be keyframed. If keyframed changes in direction or speed are desired, the Wind behavior (discussed below) should be used. If a more complex animation path is desired, the Motion Path behavior should be used.

A simple example of the Throw behavior is to send a series of offscreen objects moving across the screen. When used in conjunction other behaviors such as Grow/Shrink and Fade In/Fade Out, a user can create sophisticated moving elements without keyframing a single parameter. The Throw behavior is also useful when the user is moving an object through a simulation. For example, the user might move the object past other objects that have Attractor or Repel behaviors applied to them. Since the Throw behavior only applies a single force to move the target object at the initial frame of the behavior, any other behaviors that interact with the target object have potentially greater influence over its motion.

Behaviors related to Throw include Motion Path, Gravity, Random Motion, and Wind.

A. Parameters

In one embodiment, the following parameters are available for the Throw behavior in the Inspector:

Affect Subobjects: This parameter appears when Throw is applied to an object that contains multiple objects, such as a group, a particle emitter, a replicator, or a text layer. When this checkbox is turned on, all objects within the parent object are affected by the behavior individually. When this checkbox is turned off, all objects within the parent object are affected by the behavior together, as if they were a single object.

Increment: The Increment parameter is set by a pop-up menu that enables a user to specify how the behavior's effect progresses over its duration in the Timeline. In one embodiment, there are two options:

Continuous Rate: This option sets the speed of the object at a steady number of pixels per second, specified in the Throw Velocity parameter. If the Canvas is displaying a nonsquare pixel image, the vertical rate is in pixels per second, and the horizontal rate is the perceptual equivalent.

Ramp to Final Value: This option moves the object from its original position to the specified distance (in pixels) in the Throw Distance parameter.

Throw Velocity/Throw Distance: When the Increment pop-up menu is set to Continuous Rate, the Throw Velocity parameter appears. This parameter enables a user to specify a continuous speed for the object to move in three-dimensional space (i.e., X, Y, and Z space). When the Increment pop-up menu is set to Ramp to Final Value, the Throw Distance parameter appears. This parameter sets a total distance (in pixels) for the object to travel in three-dimensional (X, Y, and Z) space over its duration. In one embodiment, the slider is limited to 100 pixels. In order to enter a value greater than 100, use the value field.

B. HUD

Figure 11:
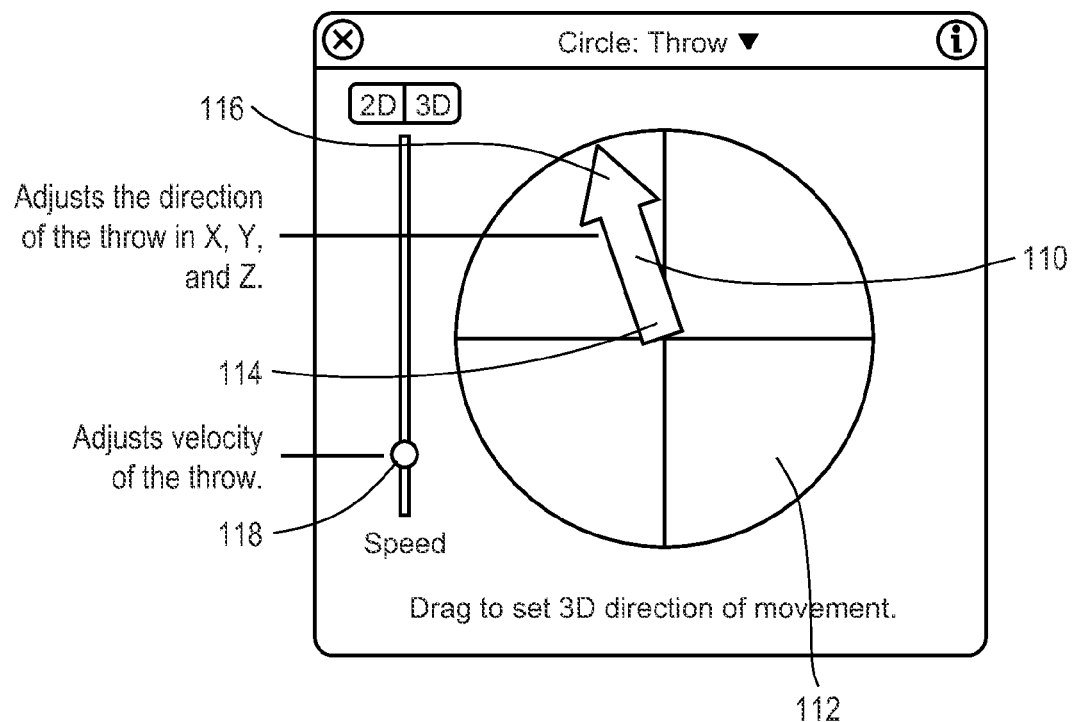
FIG. 11 illustrates a HUD for a Throw behavior where motion can be three-dimensional, according to one embodiment of the invention.

In one embodiment, the Throw behavior has two different HUDs. A first HUD is used to specify motion in two-dimensional space, and a second HUD is used to specify motion in three-dimensional space. FIG. 9 illustrates a HUD for a Throw behavior where motion is two-dimensional, according to one embodiment of the invention. FIG. 11 illustrates a HUD for a Throw behavior where motion can be three-dimensional, according to one embodiment of the invention.

The two-dimensional (2D) HUD of FIG. 9 enables a user to specify the direction and speed of the Throw behavior. The HUD includes a special control and a slider control. The special control includes an arrow 90 within a circular region 92 (called a "dish"). The tail of the arrow 94 is located in the center of the dish 92, and the head of the arrow 96 is pointing toward the edge of the dish 92. The user drags the arrow 90 to specify the direction and speed. For example, the user mouses down on the head of the arrow 96, moves the cursor in order to drag the arrow head, and mouses up when the head is in the desired position. The direction of the arrow 90 defines the direction of movement in 2D space (i.e., X and Y space), and the length of the arrow 90 defines speed (velocity) where a longer arrow implies a larger speed.

Figure 10:
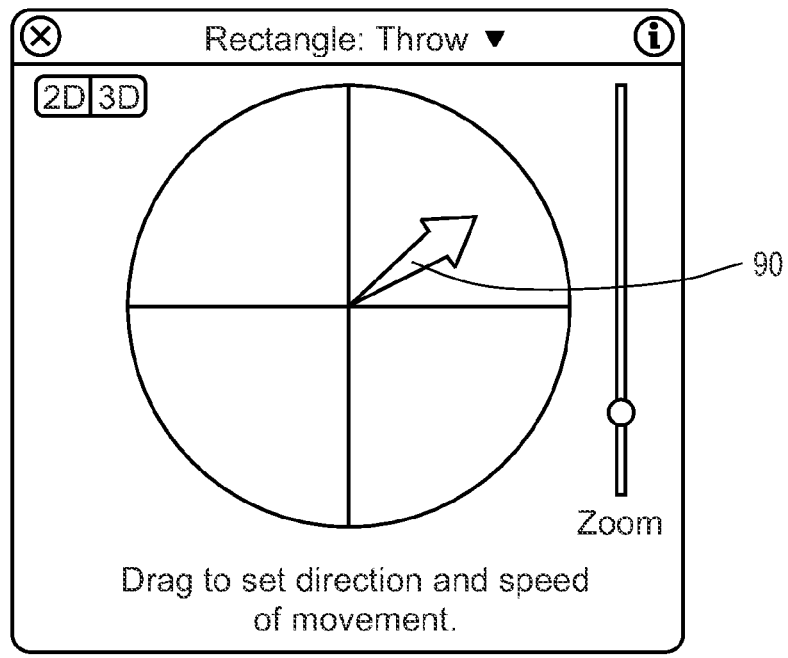
FIG. 10 illustrates another HUD for a Throw behavior where motion is two-dimensional, according to one embodiment of the invention.

In FIG. 9, the arrow 90 is pointing in a northwestern direction. This means that the object will move in a northwestern direction. FIG. 10 illustrates another HUD for a Throw behavior where motion is two-dimensional, according to one embodiment of the invention. In FIG. 10, the arrow is pointing in a northeastern direction. This means that the object will move in a northeastern direction.

In one embodiment, the HUD for a newly-created Throw behavior includes a small "+" symbol (not shown) in the center of the dish 92 to indicate the lack of an arrow 90 (and, therefore, no motion). As the user drags the cursor, the arrow 90 appears in the dish 92.

The slider control 98 to the right enables a user to adjust the scale of the special control, thereby increasing or decreasing the effect that this direction/speed control has over the object. In other words, the slider 98 controls the "zoom" of the dish 92. Dragging the slider 98 upwards zooms out to display more area of the dish 92. If more area of the dish is displayed, the control becomes more sensitive, so dragging the arrow 90 will create more dramatic motion. Dragging the slider 98 downwards zooms in to display a smaller region, so dragging the arrow 90 will create finer control over the movement.

The three-dimensional (3D) HUD of FIG. 11 also enables a user to specify the direction and speed of the Throw behavior. Similar to the 2D HUD, the 3D HUD also includes a special control and a slider control. However, the special control and the slider control specify different values than they did in the 2D HUD of FIG. 9. In FIG. 11, the arrow 110 defines the direction in which the object is thrown in 3D (X, Y, and Z) space. The slider 118, which is located on the left side of the HUD, enables a user to specify the velocity of the thrown object.

In FIG. 11, the special control includes an arrow 110 within a circular region 112 (called a "dish"). The tail of the arrow 114 is located in the center of the dish 112, and the head of the arrow 116 is pointing toward the edge of the dish 112. In one embodiment, the length of the arrow 110 is constant (e.g., equal to the radius of the dish 112).

Figure 12:
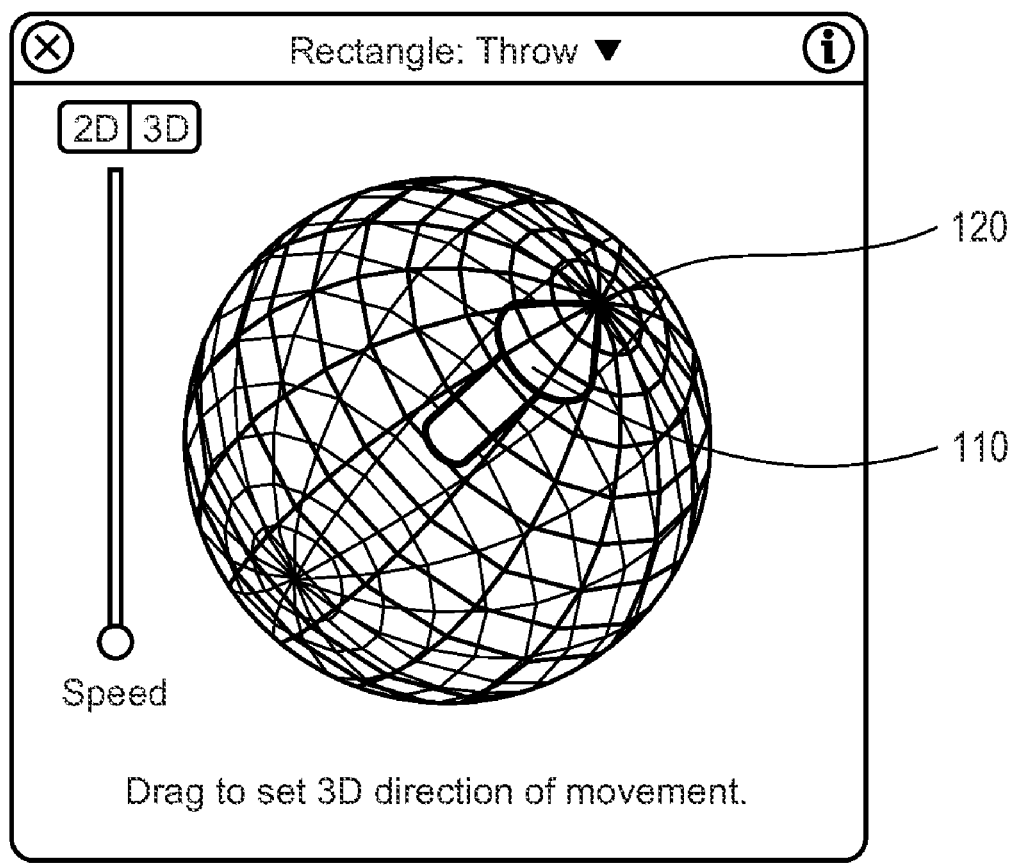
FIG. 12 illustrates a HUD for a Throw behavior where motion can be three-dimensional and where a user is currently mousing down within the dish, according to one embodiment of the invention.
Figure 13:
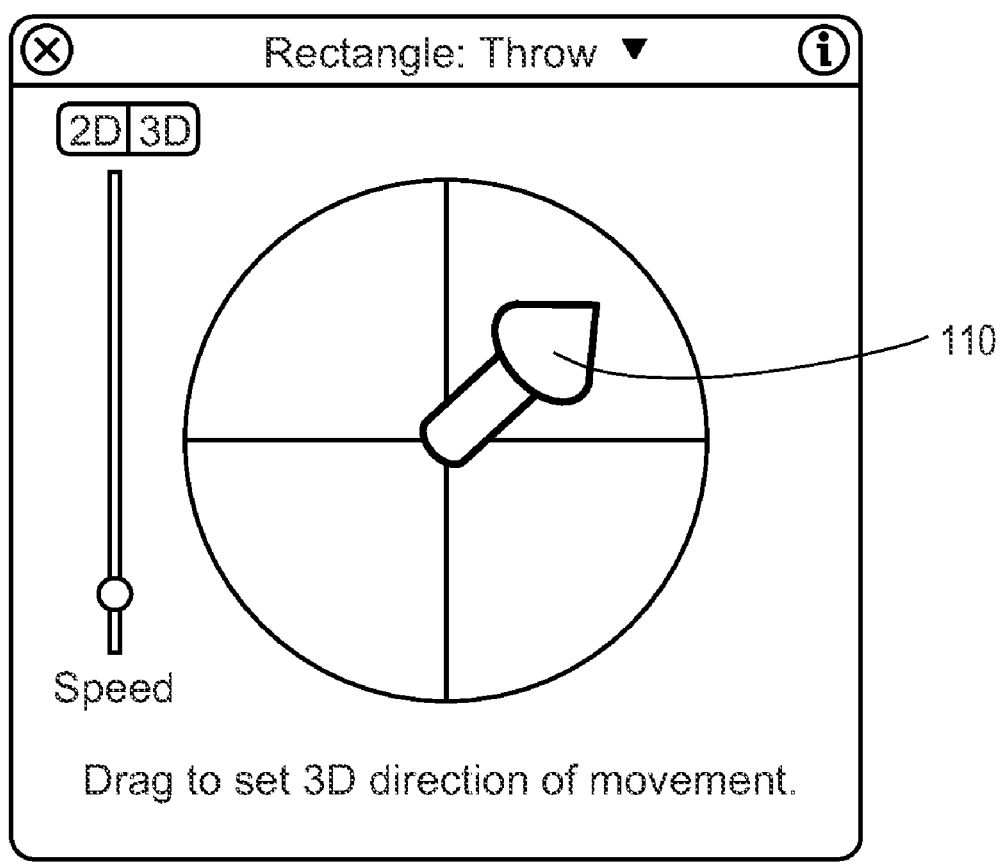
FIG. 13 illustrates a HUD for a Throw behavior where motion is three-dimensional, according to one embodiment of the invention.

FIG. 12 illustrates a HUD for a Throw behavior where motion can be three-dimensional and where a user is currently mousing down within the dish, according to one embodiment of the invention. In one embodiment, when the user mouses down anywhere within the dish 112, a spherical mesh 120 appears. The spherical mesh 120 acts like a virtual trackball or spaceball that spins in place on the screen. The arrow 110 is fixed within the sphere 120 so that it moves as the sphere moves. Thus, by dragging the mouse and moving the sphere 120, the user can move the arrow 110 to specify any 3D direction. After the sphere 120 (and, therefore, the arrow 110) are in the desired position, the user mouses up and the sphere 120 disappears. At this point, the HUD might appear as shown in FIG. 13. FIG. 13 illustrates a HUD for a Throw behavior where motion is three-dimensional, according to one embodiment of the invention.

In FIG. 11, the arrow 110 appears "flat" relative to the screen. This means that the object will move in a two-dimensional direction (i.e., with no movement along the Z axis). In FIG. 13, the arrow 110 appears to point outwards from the screen towards the user. This means that the object will move in a three-dimensional direction (with upward movement along the Z axis).

In one embodiment, a user can switch to the 2D HUD by clicking a button labeled "2D." Similarly, a user can switch to the 3D HUD by clicking a button labeled "3D."

In one embodiment, the maximum speed that a user can define with the Throw HUD (2D or 3D) is not the maximum possible speed. For example, higher values can be entered into the Increment parameter in the Behaviors tab of the Inspector.

In one embodiment, pressing the Shift key while dragging the arrow constrains the arrow to 45 degree angles (2D or 3D HUD). In the 2D HUD, pressing the Command key while dragging the arrow to change its direction maintains the arrow's length as a constant.

Wind

The Wind behavior is a simulation behavior. Some simulation behaviors, such as Gravity, animate the parameters of an object in a way that simulates a real-world phenomenon. Other simulation behaviors, such as Attractor and Repel, affect the parameters of one or more objects surrounding the object to which they're applied. Simulation behaviors enable a user to create very sophisticated interactions among multiple objects in a project with a minimum of adjustments. Like the basic motion behaviors, simulation behaviors also affect specific object parameters. A simulation behavior can be applied to various types of objects, including cameras and lights.

The Wind behavior affects an object's position. Apply the Wind behavior to an object to animate its position and move it in a specified direction with a specified speed. Unlike Throw, the Wind behavior is designed to emulate real-life wind. Instead of a single, initial force, Wind pushes on the image constantly. The velocity specified by the Wind behavior is a continuous force, and its parameters can be keyframed to achieve gradual changes in speed and direction. For example, the object can start out moving slowly and then pick up speed over time.

The Wind behavior is preferable to the Throw behavior when a user wants to vary the speed of the object being animated. A user can vary the speed and/or direction of the object by either applying another behavior (such as randomize or ramp) or keyframing the Velocity parameter of the Wind behavior. As explained above, a user cannot make changes in either speed or direction with the Throw behavior.

Behaviors related to Wind include Motion Path, Gravity, Random Motion, and Throw.

A. Parameters

The parameters in the Inspector are similar to those of Throw. In one embodiment, the following parameters are available for the Wind behavior in the Inspector:

Affect Subobjects: This parameter appears when Wind is applied to an object that contains multiple objects, such as a group, a particle emitter, a replicator, or a text layer. When this checkbox is turned on, all objects within the parent object are affected by the behavior individually. When this checkbox is turned off, all objects within the parent object are affected by the behavior together, as if they were a single object.

Air Thickness: The Air Thickness parameter is set by a slider and value slider that adjust how fast the object accelerates on the X, Y, and Z axes when the speed is changed. In one embodiment, lower values (simulating thinner air) have less effect when pushing the object, so it takes longer to get up to speed. In another embodiment, higher values (thicker air) have more effect and push the object up to speed more quickly.

Velocity: The Velocity parameter is set by a slider and a value slider that adjust the speed on the X, Y, and Z axes at which the simulated air is blowing the object. In one embodiment, higher values result in faster motion.

B. HUD

Figure 14:
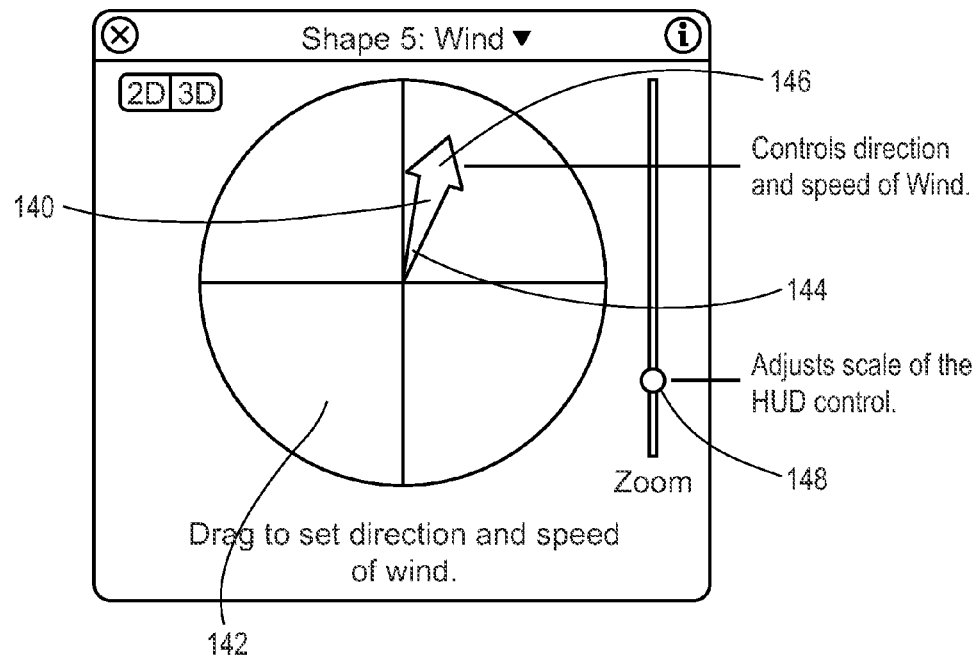
FIG. 14 illustrates a HUD for a Wind behavior where motion is two-dimensional, according to one embodiment of the invention.
Figure 15:
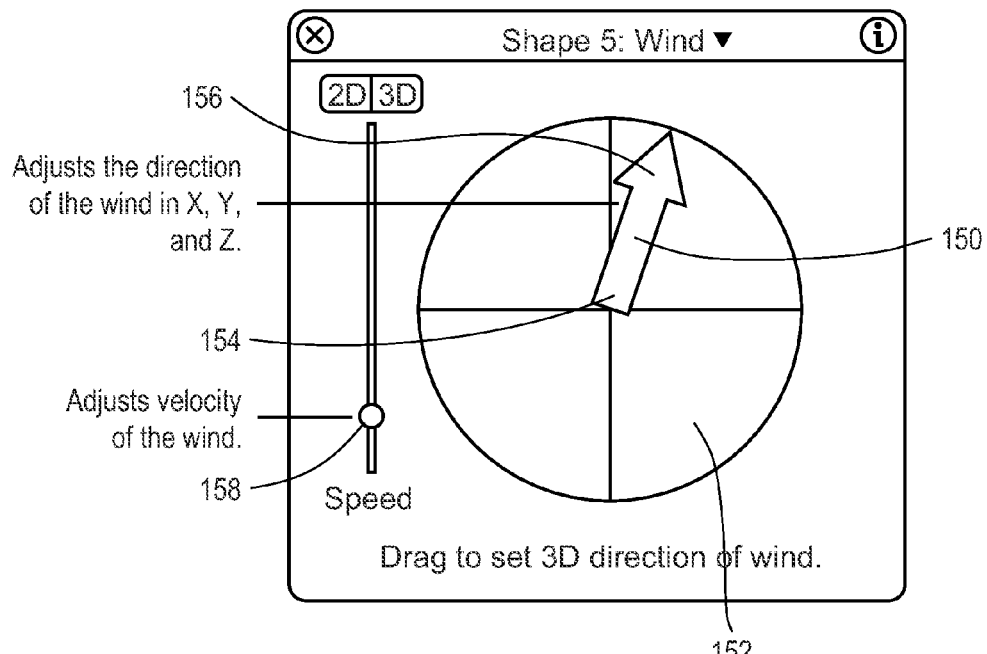
FIG. 15 illustrates a HUD for a Wind behavior where motion can be three-dimensional, according to one embodiment of the invention.

The HUDs for Wind are similar to the HUDs for Throw. In one embodiment, the Wind behavior has two different HUDs. A first HUD is used to specify motion in two-dimensional space, and a second HUD is used to specify motion in three-dimensional space. FIG. 14 illustrates a HUD for a Wind behavior where motion is two-dimensional, according to one embodiment of the invention. FIG. 15 illustrates a HUD for a Wind behavior where motion can be three-dimensional, according to one embodiment of the invention.

The two-dimensional (2D) HUD of FIG. 14 enables a user to specify the direction and speed of the Wind behavior. The HUD includes a special control and a slider control. The special control includes an arrow 140 within a circular region 142 (called a "dish"). The tail of the arrow 144 is located in the center of the dish 142, and the head of the arrow 146 is pointing toward the edge of the dish 142. The user drags the arrow 140 to specify the direction and speed. For example, the user mouses down on the head of the arrow 146, moves the cursor in order to drag the arrow head, and mouses up when the head is in the desired position. The direction of the arrow 140 defines the direction of movement in 2D space (i.e., X and Y space), and the length of the arrow 140 defines speed (velocity) where a longer arrow implies a larger speed. In FIG. 14, the arrow 140 is pointing in a northeastern direction. This means that the object will move in a northeastern direction.

In one embodiment, the HUD for a newly-created Wind behavior includes a small "+" symbol (not shown) in the center of the dish 142 to indicate the lack of an arrow 140 (and, therefore, no motion). As the user drags the cursor, the arrow 140 appears in the dish 142.

The slider control 148 to the right enables a user to adjust the scale of the special control, thereby increasing or decreasing the effect that this direction/speed control has over the object. In other words, the slider 148 controls the "zoom" of the dish 142. Dragging the slider 148 upwards zooms out to display more area of the dish 142. If more area of the dish is displayed, the control becomes more sensitive, so dragging the arrow 140 will create more dramatic motion. Dragging the slider 148 downwards zooms in to display a smaller region, so dragging the arrow 140 will create finer control over the movement.

The three-dimensional (3D) HUD of FIG. 15 also enables a user to specify the direction and speed of the Wind behavior. Similar to the 2D HUD, the 3D HUD also includes a special control and a slider control. However, the special control and the slider control specify different values than they did in the 2D HUD of FIG. 14. In FIG. 15, the arrow 150 defines the direction in which the object is thrown in 3D (X, Y, and Z) space. The slider 158, which is located on the left side of the HUD, enables a user to specify the velocity of the thrown object.

In FIG. 15, the special control includes an arrow 150 within a circular region 152 (called a "dish"). The tail of the arrow 154 is located in the center of the dish 152, and the head of the arrow 156 is pointing toward the edge of the dish 152. In one embodiment, the length of the arrow 150 is constant (e.g., equal to the radius of the dish 152).

In one embodiment, when the user mouses down anywhere within the dish 152, a spherical mesh appears (similar to the Throw 3D HUD). The spherical mesh is manipulated like in the Throw 3D HUD and is similarly used to specify any 3D direction.

In FIG. 15, the arrow 150 appears "flat" relative to the screen. This means that the object will move in a two-dimensional direction (i.e., with no movement along the Z axis).

In one embodiment, a user can switch to the 2D HUD by clicking a button labeled "2D." Similarly, a user can switch to the 3D HUD by clicking a button labeled "3D."

In one embodiment, the maximum speed that a user can define with the Wind HUD (2D or 3D) is not the maximum possible speed. For example, higher values can be entered into the Increment parameter in the Behaviors tab of the Inspector.

In one embodiment, pressing the Shift key while dragging the arrow constrains the arrow to 45 degree angles (2D or 3D HUD). In the 2D HUD, pressing the Command key while dragging the arrow to change its direction maintains the arrow's length as a constant.

Spin

The Spin behavior is a basic motion behavior. A basic motion behavior animates a specific parameter of the object to which it has been applied. Some basic motion behaviors affect an object's position, while others affect an object's scale, rotation, or opacity. A basic motion behavior can be applied to various types of objects, such as an image, a clip, a particle emitter, a shape, text, etc. Most basic motion behaviors can also be applied to cameras and lights.

The Spin behavior affects an object's rotation. Apply the Spin behavior to animate the rotation of an object, spinning it around a single axis (either clockwise or counter-clockwise) at a constant rate. Using the Custom axis controls, the rotation does not have to occur on a principle axis (i.e., X, Y, or Z). If a user trims the end of the Spin behavior to be shorter than the duration of the object to which it is applied, the object remains at the angle of the last frame of the behavior, as long as there are no other behaviors or keyframes affecting that object's Rotation parameter.

Uses for Spin are fairly obvious, but another way to use the Spin behavior is with objects that have an off-center anchor point. Since objects rotate about the anchor point, if a user changes an object's anchor point before he applies a spin behavior to it, he can quickly change the look of the motion he creates.

A. Parameters

In one embodiment, the following parameters are available for the Spin behavior in the Inspector:

Affect Subobjects: This parameter appears when Spin is applied to an object that contains multiple objects, such as a group, a particle emitter, a replicator, or a text layer. When this checkbox is turned on, all objects within the parent object are affected by the behavior individually. When this checkbox is turned off, all objects within the parent object are affected by the behavior together, as if they were a single object.

Increment: The Increment parameter is set by a pop-up menu that enables a user to specify how the behavior's effect progresses over its duration in the Timeline. In one embodiment, there are two options:

Continuous Rate: This option spins the object at a steady number of degrees per second, specified in the Spin Rate parameter.

Ramp to Final Value: This option spins the object for the number of degrees specified in the Spin To parameter over the behavior's duration in the Timeline.

Spin Rate/Spin To: The Spin Rate/Spin To parameter is set by a dial that controls the speed at which the object spins. When Increment is set to Continuous Rate, the Spin Rate defines a continuous rate of spin in degrees per second. When Increment is set to Ramp to Final Value, Spin To defines a number of degrees to spin over that object's duration. In one embodiment, negative values result in clockwise motion, while positive values result in counter-clockwise motion.

Axis: The Axis parameter is set by a pop-up menu that enables a user to specify whether the object spins about the X, Y, or Z axis. Alternatively, the user can choose Custom, which yields additional Longitude and Latitude parameters. These parameters enable the object to spin at an angle (i.e., not locked to the X, Y, or Z axes).

Figure 16:
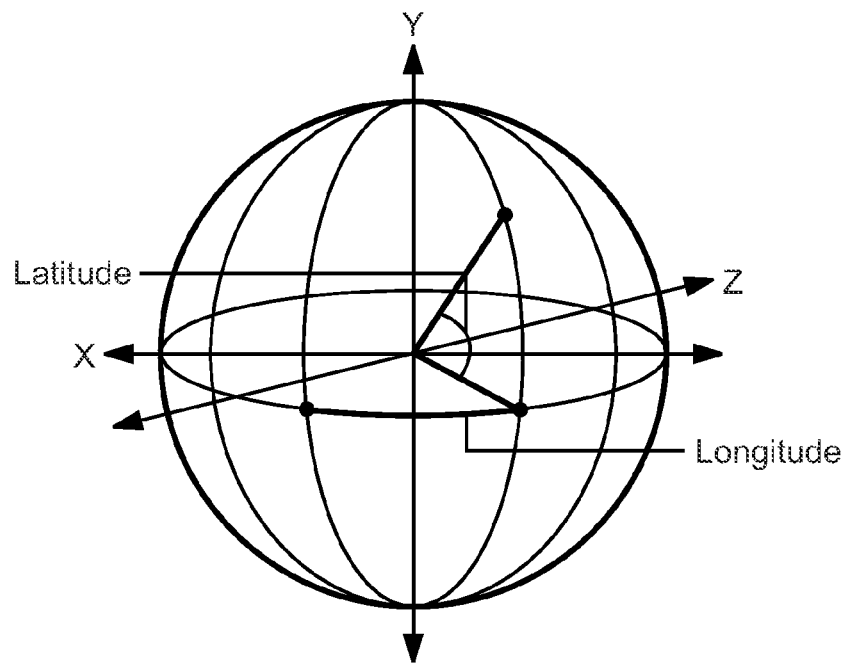
FIG. 16 illustrates the meanings of the Latitude and Longitude parameters.

Latitude/Longitude: The Latitude and Longitude parameters are available when the Axis parameter is set to Custom (or by dragging inside the center control of the Spin HUD, discussed below). These parameters enable a user to specify the axis of rotation, around which the object will spin. FIG. 16 illustrates the meanings of the Latitude and Longitude parameters.

B. HUD

Figure 17:
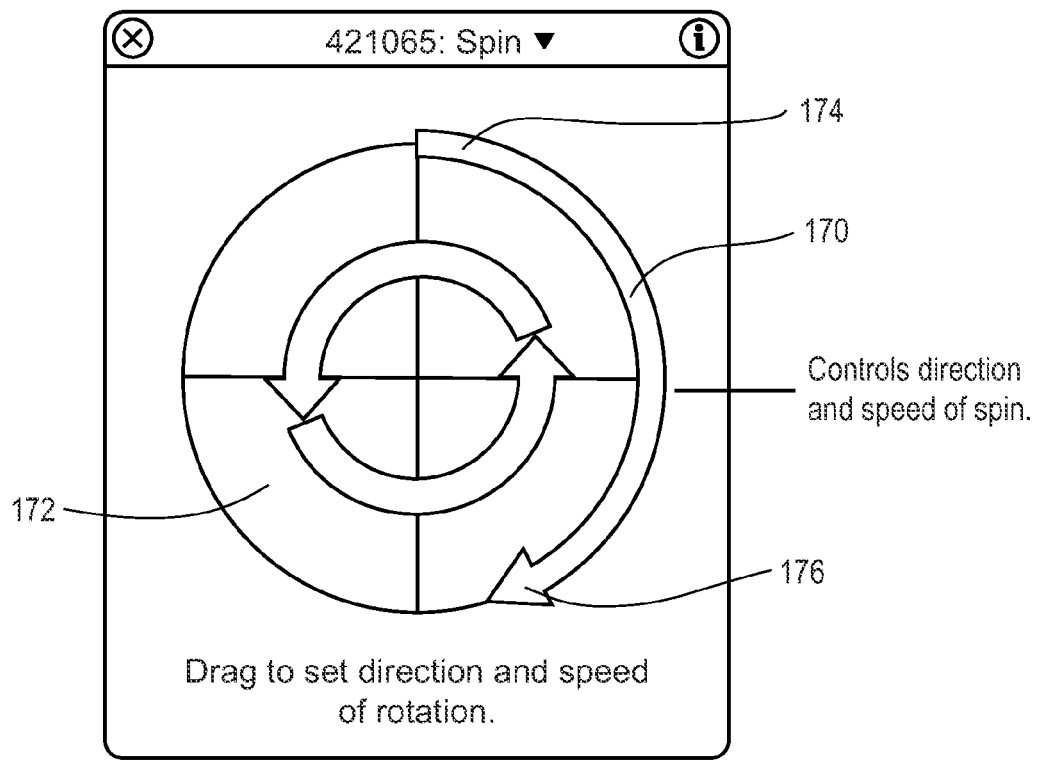
FIG. 17 illustrates a HUD for a Spin behavior, according to one embodiment of the invention.

In one embodiment, the Spin behavior has a single HUD that can be used to specify motion in either two-dimensional or three-dimensional space. FIG. 17 illustrates a HUD for a Spin behavior, according to one embodiment of the invention.

The HUD of FIG. 17 enables a user to specify the direction and speed of the Spin behavior. The HUD includes a special control. The special control includes an arrow 170 that lies along the circumference of a circular region 172 (called a "dish"). The tail of the arrow 174 is located at the top of the dish 172. The head of the arrow 176 is located anywhere along the circumference of the dish 172. The user drags the arrow 170 to specify the direction and speed of the spin. For example, the user mouses down on the head of the arrow 176, moves the cursor in order to drag the arrow head, and mouses up when the head is in the desired position. The direction of the arrow 170 defines the direction of the spin (i.e., clockwise or counter-clockwise), and the length of the arrow 170 defines speed (velocity) where a longer arrow implies a larger speed.

Figure 18:
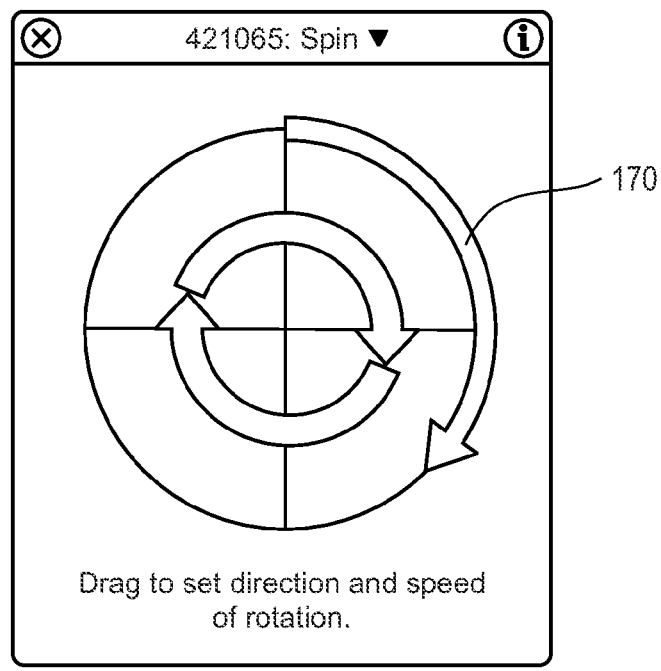
FIG. 18 illustrates another HUD for a Spin behavior, according to one embodiment of the invention.

In FIG. 17, the arrow 170 is pointing in a clockwise direction. This means that the object will spin in a clockwise direction. FIG. 18 illustrates another HUD for a Spin behavior, according to one embodiment of the invention. In FIG. 18, the arrow is also pointing in a clockwise direction. This means that the object will move in a clockwise direction. Note that the lengths of the arrows 170 in FIGS. 17 and 18 are different. In particular, the arrow 170 in FIG. 17 is longer than the arrow 170 in FIG. 18. This means that the Spin speed caused by the HUD in FIG. 17 will be greater than the Spin speed caused by the HUD in FIG. 18.

In one embodiment, dragging the arrow head 176 around the dish 172 multiple times increases the rate of the spin. If the amount of dragging increases beyond one circumference of the dish 172, the arrow head 176 overlaps its tail 174. In one embodiment, if this occurs, a small multiplier (e.g., "×3"; not shown) is displayed in the lower right corner of the HUD, indicating the number of revolutions.

In one embodiment, the HUD for a newly-created Spin behavior includes a small "+" symbol (not shown) at the top of the dish 172 to indicate the lack of an arrow 170 (and, therefore, no motion). As the user drags the cursor, the arrow 170 appears along the circumference of the dish 172.

Figure 19:
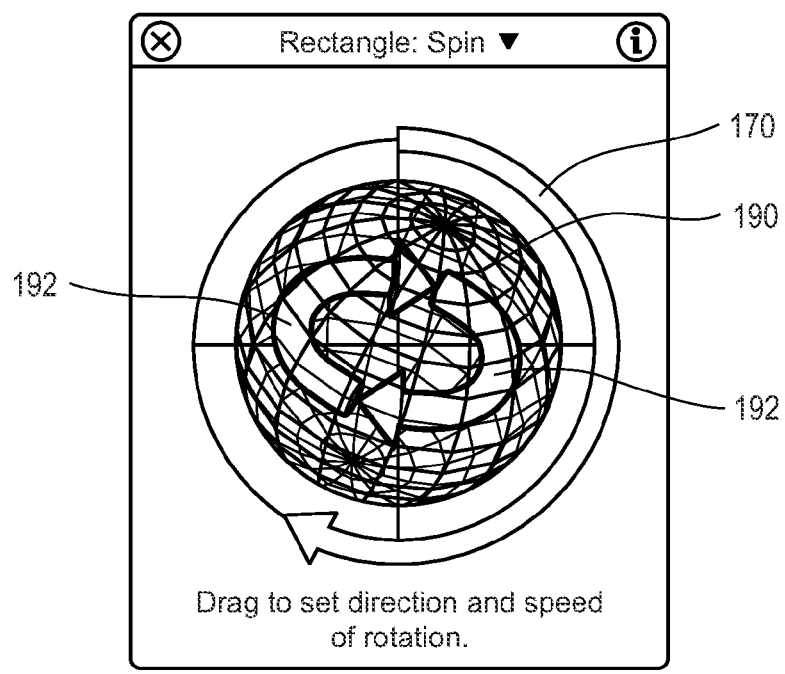
FIG. 19 illustrates a HUD for a Spin behavior where a user is currently mousing down within the dish, according to one embodiment of the invention.
Figure 20:
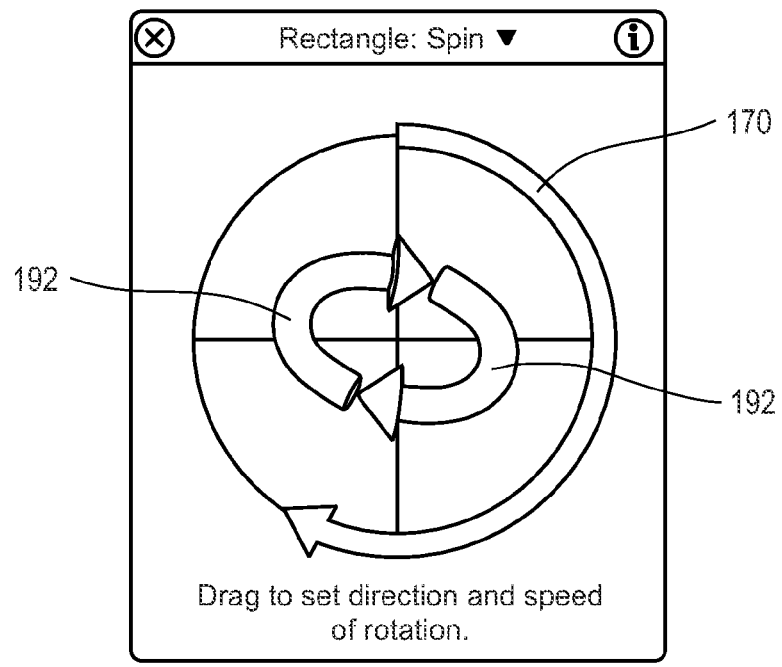
FIG. 20 illustrates a HUD for a Spin behavior where the axis of rotation is custom (e.g., not the X, Y, or Z axis), according to one embodiment of the invention.

The inside of the dish 172 controls the axis around which the object will spin. FIG. 19 illustrates a HUD for a Spin behavior where a user is currently mousing down within the dish, according to one embodiment of the invention. In one embodiment, when the user mouses down anywhere within the dish 172, a spherical mesh 190 appears. The spherical mesh 190 acts like a virtual trackball or spaceball that spins in place on the screen. The contents of the sphere 190 are fixed within the sphere 190 so that they move as the sphere moves. In the illustrated embodiment, the sphere contains two curved arrows 192 that show the direction of the spin. In another embodiment (not shown), the sphere contains a line that indicates the axis of rotation (around which the object will spin). Thus, by dragging the mouse and moving the sphere 190, the user can move the axis of rotation to specify a custom axis that differs from the X, Y, and Z axis. After the sphere 190 (and, therefore, the axis of rotation) are in the desired position, the user mouses up and the sphere 190 disappears. At this point, the HUD might appear as shown in FIG. 20. FIG. 20 illustrates a HUD for a Spin behavior where the axis of rotation is custom (e.g., not the X, Y, or Z axis), according to one embodiment of the invention.

Figure 21:
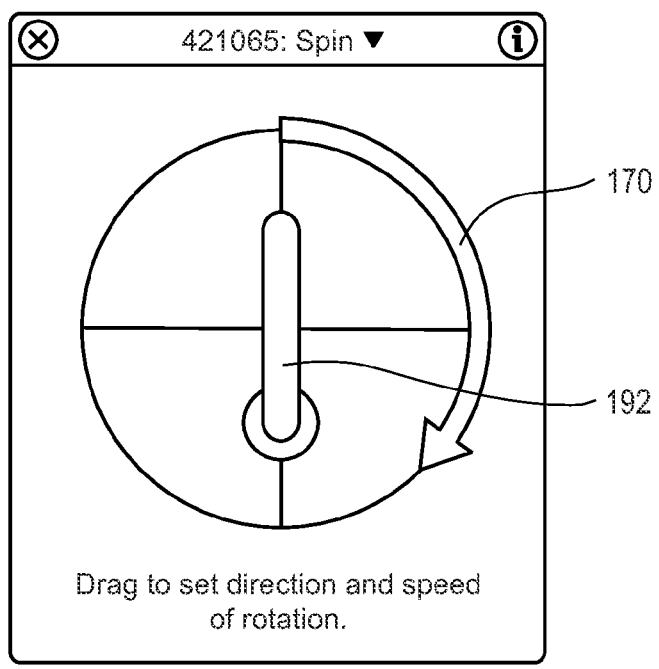
FIG. 21 illustrates a HUD for a Spin behavior where the axis of rotation is set to the X axis, according to one embodiment of the invention.
Figure 22:
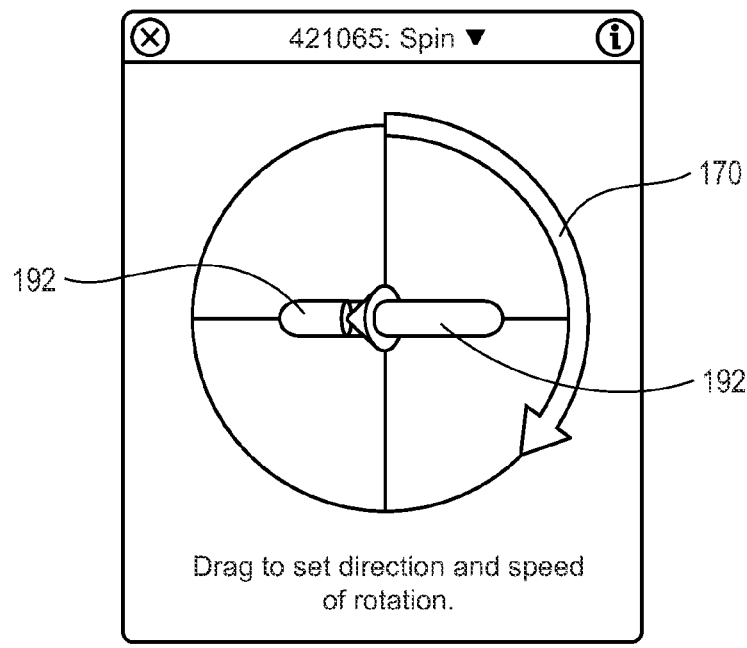
FIG. 22 illustrates a HUD for a Spin behavior where the axis of rotation is set to the Y axis, according to one embodiment of the invention.

In FIG. 17, the arrows 192 appear "flat" relative to the screen. This means that the axis of rotation is set to the Z axis and is pointing out of the screen towards the user. FIG. 21 illustrates a HUD for a Spin behavior where the axis of rotation is set to the X axis, according to one embodiment of the invention. The arrows 192 within the dish 172 show the direction of rotation. FIG. 22 illustrates a HUD for a Spin behavior where the axis of rotation is set to the Y axis, according to one embodiment of the invention. Again, the arrows 192 within the dish 172 show the direction of rotation.

Emitter

Using Particle Systems, a user can simulate real-world effects such as smoke and sparks, or he can create sophisticated abstract textures. Particle Systems enable a user to quickly and easily create sophisticated animated effects involving large numbers of automatically animated objects. A particle emitters library can be used to add a pre-made particle system to a composition, or custom particle effects can be created using nearly any layer or group in a project. Particle systems are flexible enough to create many different kinds of effects.

A particle system consists of two basic elements: a cell and an emitter. The cell acts as the "mold" for the particles that are generated by the emitter. Nearly any layer or group can be used as a source for a particle cell, including images, shapes, text, movies, and image sequences. Each particle that is created is essentially a duplicate of the original cell and is animated according to the parameters for that particle system (a particle cell and emitter) over its lifetime.

The layer is used as a particle system's cell determines how that particle system looks. A particle system can contain multiple cells, resulting in the release of several types of particles from a single emitter. Many of the most sophisticated particle presets are constructed in this way.

A particle system comprises an emitter and one or more particle cells. Each cell appears inside of the emitter in the Layers tab and the Timeline. The emitter and cells have separate sets of parameters that control the particle system's behavior. If a garden hose were a particle system, the nozzle would act as the emitter, while the water would represent the flow of particles. Changing the parameters of the emitter changes the shape from which the particles are emitted and their direction, while changing the cell's parameters affects each individual particle. By changing a few parameters, it's possible to create very different effects using the same cell.

In a particle system, cells and particles are not the same thing. A cell is a layer (in the Layers list) that acts as the "mold" for the particles (the multiple objects generated in the Canvas). The cell itself is a copy of a source object ("cell source") that appears dimmed (disabled) in the Layers list, and therefore is by default not visible in the Canvas.

Particle system parameters can be keyframed in order to change a particle effect's dynamics over time. For example, by keyframing an emitter's Position parameter, a path of bubbles can be created that follows an object onscreen. It is also possible for an emitter's Position parameter to track a moving object in a clip and to apply existing tracking data in a project to an emitter.

Behaviors can be added to a cell or to an emitter to create even more varied effects. Simulation behaviors can be especially effective. A behavior that is applied to a cell is in turn applied to a particle that it generates. This enables almost limitless variation. Adding behaviors to cells in addition to the particle system's own parameters is an easy way to create complex, organic motion that would be impossible to accomplish any other way. For example, if a Repel behavior is applied to another object in a project (an object that is not part of the particle system), the particles will weave around that object.

A. Parameters

When an emitter is created, the particle system starts working according to the default parameters in its Emitter tab and Particle Cell tab, located in the Inspector. Although several parameters are available in the Emitter tab, only a few will be described here. They are:

Birth Rate: How many particles are created every second.

Life: How long each particle remains onscreen (in seconds) before disappearing from existence.

Scale: The size of each particle, relative to the original size of the cell.

Emission Range: The range of degrees at which particles are generated and/or from which particles emerge.

Emission Angle: The direction into which particles will be emitted. This parameter is available only when the Emission Range is constrained to a subsection of the Emission control (described below).

Emission Speed: How quickly particles move away from the emitter.

B. HUD

Figure 23:
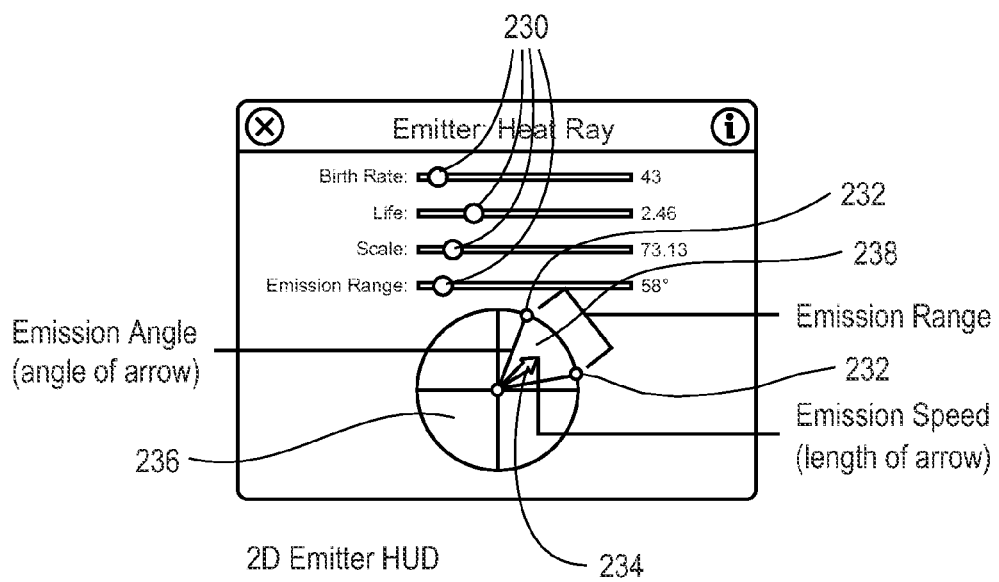
FIG. 23 illustrates a HUD for an Emitter object where particle motion is two-dimensional, according to one embodiment of the invention.
Figure 24:
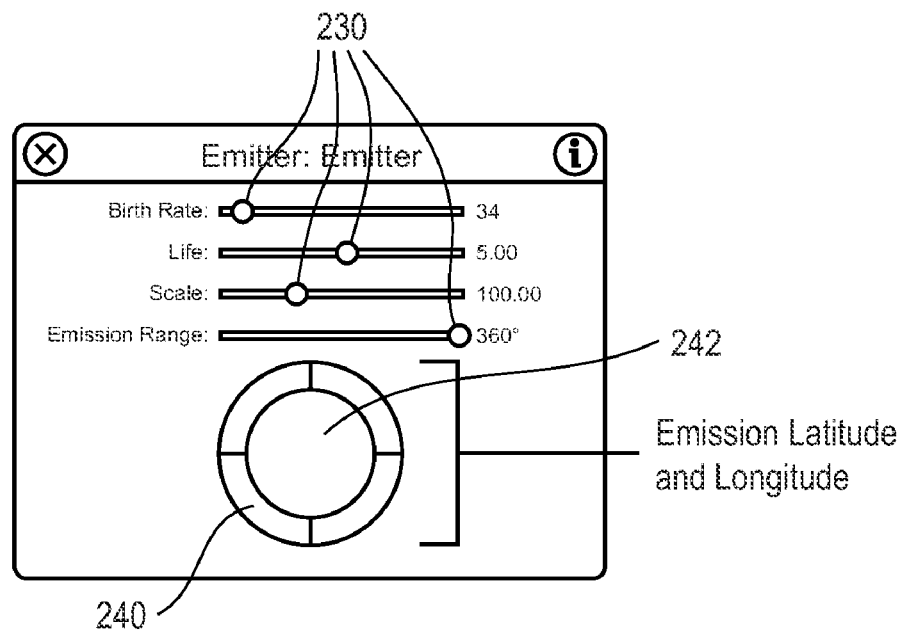
FIG. 24 illustrates a HUD for an Emitter object where particle motion is three-dimensional, according to one embodiment of the invention.

In one embodiment, the Emitter object has two different HUDs. A first HUD is used to specify particle motion in two-dimensional space, and a second HUD is used to specify particle motion in three-dimensional space. FIG. 23 illustrates a HUD for an Emitter object where particle motion is two-dimensional, according to one embodiment of the invention. FIG. 24 illustrates a HUD for an Emitter object where particle motion is three-dimensional, according to one embodiment of the invention.

An Emitter HUD can be used to easily change some of the parameters that are available in the Emitter tab. Select an emitter to see its parameters in the HUD. In one embodiment, an Emitter HUD contains controls that modify a particle system's size and shape. These parameters are a subset of those found in the Emitter tab of the Inspector.

For a particle system that contains multiple cells, the Emitter HUD parameters simultaneously modify the effect of each cell's parameters relative to one another. This means that for a particle system consisting of two cells with different scale values, changing the scale in the HUD resizes both cells simultaneously. For example, increasing the scale in the HUD by 200% does not change the scale of both cells to 200%, but resizes the cells relative to their original scale values. For this reason, in a particle system with multiple cells, the HUD parameters are displayed as percentages. When the parameters of a single cell are modified, the cell parameters are adjusted directly.

In one embodiment, both the two-dimensional (2D) HUD of FIG. 23 and the three-dimensional (3D) HUD of FIG. 24 include a special control (called an "Emission control") and various slider controls. The slider controls 230 are used to set the Birth Rate, Life, Scale, and Emission Range parameters.

The Emission control in the 2D HUD provides a graphical way to manipulate three different emitter parameters: Emission Range, Emission Angle, and Emission Speed. The Emission control includes two points 232 and one or more arrows 234 within a circular region 236 (called a "dish"). The points 232 are located on the circumference of the dish 236 and can be dragged to different positions. The points 232 define an arc of the dish 236. When each point 232 is connected by a line to the center of the dish 236, a pie-piece-shaped area 238 is defined. This area defines the Emission Range (i.e., the size of the "slice" of the Emission Control pie graph that the particles fill when generated in 2D space). Stated in another way, this area acts as a graphical representation of the emitter "nozzle." As the range narrows, the particles move in a "stream" defined by the shaded area of the dish 236.

The location of the Emission Range (i.e., the direction in which it points) can be changed. In one embodiment, this is performed by mousing down anywhere within the Emission Range and then dragging until the Emission Range is in the desired position. Note that the points 232 that define the Emission Range can overlap (i.e., have the same location). In this situation, the arc is the entire circumference of the dish 236, and the Emission Range is the entire dish 236.

The tail of the arrow is located in the center of the dish 236, and the head of the arrow is pointing toward the edge of the dish 236. The user drags the arrow 234 to specify the direction and speed (similar to the Throw and Wind special controls). For example, the user mouses down on the head of the arrow, moves the cursor in order to drag the arrow head, and mouses up when the head is in the desired position. The angle of the arrow 234 within the Emission Range defines the Emission Angle parameter, and the length of the arrow 234 defines the Emission Speed parameter, where a longer arrow implies a larger speed. Multiple arrows 234 can be present.

The Emission control in the 3D HUD provides a graphical way to manipulate the Emission Latitude parameter and the Emission Longitude parameter. Together, these parameters specify the Emission Direction (in degrees latitude and longitude; discussed below) of the particles. Specific values can be entered using the Emitter tab in the Inspector.

The Emission control includes a sphere within a circular region 240 (called a "dish"). The sphere represents the Emitter. If the Emission Range parameter is set to 360° (e.g., using the slider 230), then particles can be emitted from the entire surface of the Emitter sphere. In other words, the Emission Range 242 is spherically-shaped, and it surrounds the Emitter sphere. This situation is illustrated in FIG. 24. Note that only the Emission Range 242 can be seen, since the Emitter sphere is located inside the Emission Range 242.

Figure 25:
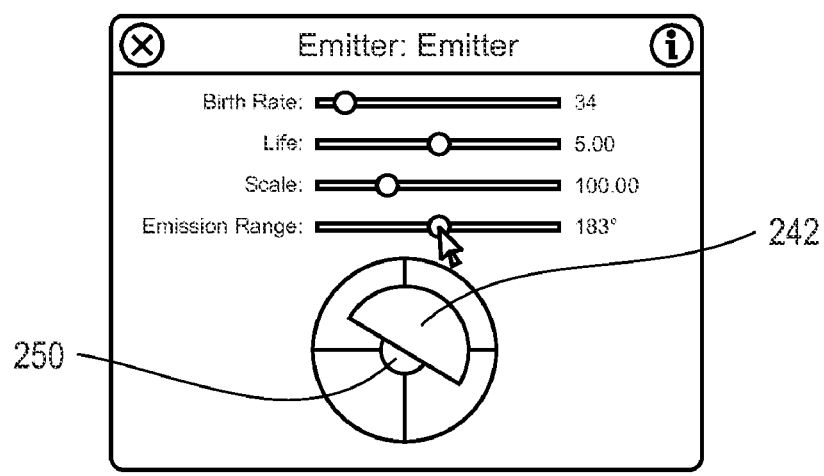
FIG. 25 illustrates a HUD for an Emitter object where particle motion is three-dimensional and where the Emission Range parameter is less than 360°, according to one embodiment of the invention.

If the Emission Range parameter is set to less than to 360°, then particles will not be emitted from the entire surface of the sphere. As a result, the Emission Range 242 shown in the Emission control will not be a sphere, and part of the Emitter sphere 250 will be visible. This situation is illustrated in FIG. 25. FIG. 25 illustrates a HUD for an Emitter object where particle motion is three-dimensional and where the Emission Range parameter is less than 360°, according to one embodiment of the invention. Specifically, the Emission Range parameter is set to 183°. In FIG. 25, the Emission Range 242 is shown by the outer half-sphere, and the Emitter 250 is shown by the inner sphere. Thus, the Emission Range represents the size of the "cone" of the Emission control sphere that the particles fill when generated in 3D space.

Figure 26:
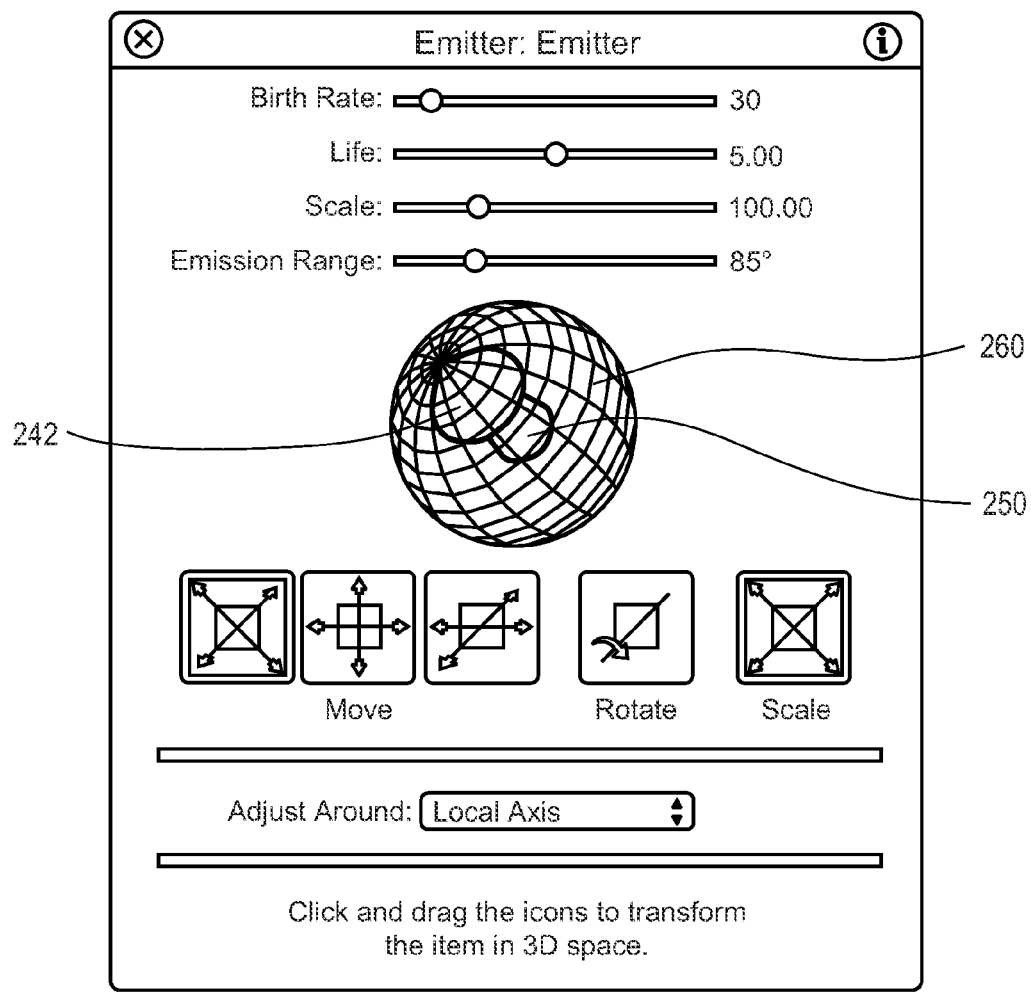
FIG. 26 illustrates a HUD for an Emitter object where particle motion is three-dimensional and where the Emission Range parameter is less than 360° and where a user is currently mousing down within the dish, according to one embodiment of the invention.

The inside of the dish 240 controls the Emission Direction (the direction in which the particles will be emitted). FIG. 26 illustrates a HUD for an Emitter object where particle motion is three-dimensional and where the Emission Range parameter is less than 360° and where a user is currently mousing down within the dish, according to one embodiment of the invention. In one embodiment, when the user mouses down anywhere within the dish 240, a spherical mesh 260 appears. The spherical mesh 260 acts like a virtual trackball or spaceball that spins in place on the screen. The contents of the sphere 260 are fixed within the sphere 260 so that they move as the sphere moves. In the illustrated embodiment, the sphere contains the Emission Range shape 242 and the Emitter sphere 250. Thus, by dragging the mouse and moving the sphere 260, the user can move the Emission Range shape 242 and the Emitter sphere 250 to specify the direction in which the particles will be emitted. After the sphere 260 (and, therefore, the Emission Range shape 242 and the Emitter sphere 250) are in the desired position, the user mouses up and the sphere 260 disappears.

In one embodiment, a modifier key can be used to more precisely manipulate the emission control. For example, pressing the Shift key while dragging to change the Emission Angle restricts the angle to 45 degree increments (2D or 3D HUD). In the 2D HUD, pressing the Shift key while dragging a point to change the Emission Range restricts the point to 22.5 degree increments. In the 2D HUD, pressing the Command key while dragging the arrow maintains the arrow's length (Emitter Speed parameter) as a constant. This is useful when only a change in direction (Emitter Angle parameter) is desired. In the 2D HUD, pressing the Option key while dragging the arrow maintains the arrow's direction (Emitter Angle parameter) as a constant. This is useful when only a change in length (Emitter Speed parameter) is desired.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs, which are stored in computer readable mediums. Furthermore, these arrangements of operations can be equivalently referred to as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "calculating" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be loaded to reside on and be operated from different type of computing platforms.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and illustrations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for animating an object according to a speed with which the object moves and a direction in which the object moves, the method comprising:
    displaying a user interface comprising:
        a control area comprising an ellipse and a slider;
        a representation of a three-dimensional vector having a variable orientation that specifies the direction, wherein the vector representation is located mostly within the ellipse;
        a first user-manipulable control element that comprises a virtual trackball, wherein the first user-manipulable control element is located within the ellipse; and
        a second user-manipulable control element that specifies the speed, wherein the second user-manipulable control element is located along the slider;
    receiving a first input via the first user-manipulable control element, the first input comprising mousing down within the virtual trackball and continuing to mouse down for a period of time;
    responsive to receiving the first input, displaying during the period of time a spherical mesh that represents the virtual trackball;
    receiving a second input via the first user-manipulable control element, the second input comprising spinning the virtual trackball to change the orientation of the vector representation while continuing to mouse down within the virtual trackball;
    receiving a third input via the first user-manipulable control element, the third input comprising mousing up;
    responsive to receiving the third input, removing the spherical mesh from display;
    receiving input via the second user-manipulable control element, the input comprising dragging the second user-manipulable control element to set the speed; and
    animating the object based on the received input.

2. The method of claim 1, wherein the vector representation comprises a three-dimensional arrow having a straight body and a tail located in the center of the ellipse, the arrow pointing toward a point on the circumference of the ellipse.

3. The method of claim 1, wherein the speed is measured in pixels per second.

4. The method of claim 1, wherein the object is animated using a Throw behavior, which exerts a single force on the object at a first frame of the behavior.

5. The method of claim 4, wherein the Throw behavior includes an additional parameter that cannot be set using the first user-manipulable control element and the second user-manipulable control element.

6. The method of claim 4, wherein the Throw behavior includes a Throw Distance parameter that indicates a distance for the object to travel over a duration of the Throw behavior.

7. The method of claim 6, wherein the distance is measured in pixels.

8. The method of claim 1, wherein the object is animated using a Wind behavior, which exerts a continuous force on the object during each frame of the behavior.

9. The method of claim 8, wherein the Wind behavior includes an additional parameter that cannot be set using the first user-manipulable control element and the second user-manipulable control element.

10. The method of claim 8, wherein the Wind behavior includes an Air Thickness parameter that indicates how fast the object accelerates when the speed is changed.

11. The method of claim 1, wherein a portion of the user interface is semi-transparent.

12. The method of claim 1, wherein the user interface is non-modal.

13. The method of claim 1, further comprising:
receiving input via a key, the input comprising pressing the key while spinning the virtual trackball to change the orientation of the vector representation and continuing to mouse down within the virtual trackball; and
responsive to receiving input via the key, restricting the orientation of the vector representation to particular degree increments.

14. The method of claim 13, wherein the particular degree increments comprise 45-degree increments.

15. A non-transitory computer-readable medium having stored thereon data representing instructions that, when executed by a processor, cause the processor to perform operations for animating an object according to a speed with which the object moves and a direction in which the object moves, the operations comprising:
displaying a user interface comprising:
a control area comprising an ellipse and a slider;
a representation of a three-dimensional vector having a variable orientation that specifies the direction, wherein the vector representation is located mostly within the ellipse;
a first user-manipulable control element that comprises a virtual trackball, wherein the first user-manipulable control element is located within the ellipse; and
a second user-manipulable control element that specifies the speed, wherein the second user-manipulable control element is located along the slider;
receiving a first input via the first user-manipulable control element, the first input comprising mousing down within the virtual trackball and continuing to mouse down for a period of time;
responsive to receiving the first input, displaying during the period of time a spherical mesh that represents the virtual trackball;
receiving a second input via the first user-manipulable control element, the second input comprising spinning the virtual trackball to change the orientation of the vector representation while continuing to mouse down within the virtual trackball;
receiving a third input via the first user-manipulable control element, the third input comprising mousing up;
responsive to receiving the third input, removing the spherical mesh from display;
receiving input via the second user-manipulable control element, the input comprising dragging the second user-manipulable control element to set the speed; and
animating the object based on the received input.

16. The computer-readable medium of claim 15, wherein the operations further comprise:
receiving input via a key, the input comprising pressing the key while spinning the virtual trackball to change the orientation of the vector representation and continuing to mouse down within the virtual trackball; and
responsive to receiving input via the key, restricting the orientation of the vector representation to particular degree increments.

17. The computer-readable medium of claim 16, wherein the particular degree increments comprise 45-degree increments.

18. A system comprising a processor configured to perform operations for animating an object according to a speed with which the object moves and a direction in which the object moves, the operations comprising:
displaying a user interface comprising:
a control area comprising an ellipse and a slider;
a representation of a three-dimensional vector having a variable orientation that specifies the direction, wherein the vector representation is located mostly within the ellipse;
a first user-manipulable control element that comprises a virtual trackball, wherein the first user-manipulable control element is located within the ellipse; and
a second user-manipulable control element that specifies the speed, wherein the second user-manipulable control element is located along the slider;
receiving a first input via the first user-manipulable control element, the first input comprising mousing down within the virtual trackball and continuing to mouse down for a period of time;
responsive to receiving the first input, displaying during the period of time a spherical mesh that represents the virtual trackball;
receiving a second input via the first user-manipulable control element, the second input comprising spinning the virtual trackball to change the orientation of the vector representation while continuing to mouse down within the virtual trackball;
receiving a third input via the first user-manipulable control element, the third input comprising mousing up;
responsive to receiving the third input, removing the spherical mesh from display;
receiving input via the second user-manipulable control element, the input comprising dragging the second user-manipulable control element to set the speed; and
animating the object based on the received input.

19. The system of claim 18, wherein the operations further comprise:
receiving input via a key, the input comprising pressing the key while spinning the virtual trackball to change the orientation of the vector representation and continuing to mouse down within the virtual trackball; and
responsive to receiving input via the key, restricting the orientation of the vector representation to particular degree increments.

20. The system of claim 19, wherein the particular degree increments comprise 45-degree increments.

* * * * *